(12) United States Patent
Changlani et al.

(10) Patent No.: US 11,477,817 B2
(45) Date of Patent: Oct. 18, 2022

(54) SYSTEMS AND METHODS FOR PRIORITIZED CHANNEL ACCESS FOR 802.11AX CLIENTS IN BSS WITH MIXED CLIENTS

(71) Applicant: HEWLETT PACKARD ENTERPRISE DEVELOPMENT LP, Houston, TX (US)

(72) Inventors: Nitin A. Changlani, Santa Clara, CA (US); Qiang Zhou, Santa Clara, CA (US); Myung Cheol Kim, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 157 days.

(21) Appl. No.: 16/950,728

(22) Filed: Nov. 17, 2020

(65) Prior Publication Data
US 2022/0159713 A1    May 19, 2022

(51) Int. Cl.
*H04W 74/00*    (2009.01)
*H04W 74/08*    (2009.01)
*H04W 28/02*    (2009.01)

(52) U.S. Cl.
CPC ..... *H04W 74/008* (2013.01); *H04W 28/0252* (2013.01); *H04W 74/0816* (2013.01)

(58) Field of Classification Search
CPC ............. H04B 7/0452; H04W 88/08; H04W 74/0808; H04W 74/085; H04W 74/08; H04W 74/008; H04W 74/0816; H04W 72/0413; H04W 72/121; H04W 72/1284; H04W 28/0252
See application file for complete search history.

(56) References Cited

U.S. PATENT DOCUMENTS

| | | | |
|---|---|---|---|
| 9,591,669 B2 | 3/2017 | Zhou et al. | |
| 10,271,353 B2 | 4/2019 | Zhou et al. | |
| 2016/0374112 A1 | 12/2016 | Asterjadhi et al. | |
| 2017/0118770 A1 | 4/2017 | Cherian et al. | |
| 2018/0103390 A1* | 4/2018 | Zhou ................. | H04W 74/0816 |

(Continued)

OTHER PUBLICATIONS

Khorov, E., et al., Several EDCA Parameter Sets for Improving Channel Access in IEEE 802.11ax Networks (Research Gate), 2016 International Symposium on Wireless Communication Systems (ISWCS), Sep. 2016, 7 Pgs.

*Primary Examiner* — Ricardo H Castaneyra
(74) *Attorney, Agent, or Firm* — Sheppard Mullin Richter & Hampton LLP

(57) ABSTRACT

Systems and methods are described for prioritizing channel access to uplink (UL) multi-user (MU) data capable active stations (STAs) by dynamically adapting a MU enhanced distributed channel access (EDCA) parameter set to provide for increased access to the channel by the UL MU data capable active STAs when the total number of active STAs associated to the AP less the number of active UL MU capable STAs exceeds the number of active UL MU data capable STAs; and by dynamically adapting the MU EDCA parameter set to equal a legacy EDCA parameter set to reduce collisions between the UL MU data capable STAs when the number of active UL MU data capable STAs exceeds or equals the total number of active STAs associated to the AP less the number of active UL MU data capable STAs.

20 Claims, 7 Drawing Sheets

(56) References Cited

U.S. PATENT DOCUMENTS

2018/0206186 A1* 7/2018 Itagaki .................. H04W 88/16
2019/0075575 A1 3/2019 Alpert et al.
2019/0274171 A1 9/2019 Viger et al.

* cited by examiner

SYSTEMS AND METHODS FOR PRIORITIZED CHANNEL ACCESS FOR 802.11AX CLIENTS IN BSS WITH MIXED CLIENTS

DESCRIPTION OF RELATED ART

In recent years, Wireless Local Area Network (WLAN) technologies have emerged as a fast-growing market. One example of the various WLAN technologies is the Institute of Electrical and Electronics Engineers (IEEE) 802.11 standard. Client devices or stations (STAB) within WLANs communicate with WLAN devices such as access points (APs) to obtain access to one or more network resources. APs can refer to digital devices that may be communicatively coupled to one or more networks (e.g., Internet, an intranet, etc.). APs may be directly connected to the one or more networks or connected via a controller. An AP, as referred to herein, may include a wireless access point (WAP) that communicates wirelessly with devices using Wi-Fi, Bluetooth or related standards and that communicates with a wired network.

APs configure various parameters for communicating with other devices, and for supporting real time services while meeting Quality of Service (QoS) requirements. The specific values configured for various parameters determine the performance of an access point such as speed and reliability.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Multiple client devices (or STAs) in the BSS can transmit frames to an AP with a variety of schemes, which among other benefits, such as increasing the information throughput on the channel, are employed to reduce the probability of frame collisions. These schemes can include MU uplink (UL) schemes wherein the channel is accessed simultaneously (i.e. at or around the same time, such as by full or partial bandwidth Multi-User Multiple Input Multiple Output (MU-MIMO), MU-Orthogonal Frequency Division Multiple Access (OFDMA), or a hybrid combination thereof). The channel can also be accessed by other schemes wherein client devices sense the channel and wait a selected amount of time before initiating a transmission (generally single user (SU) schemes). Thus WLAN devices in the BSS can access the channel with MU (generally MU capable, or high efficiency WLAN devices), but also SU means. The variety of WLAN devices and schemes means that the BSS is increasingly a mixed client environment. Moreover, with the number of WLAN devices increasing as demand for connectivity increases, the risk of frame collisions is also ever increasing. One or more parameters that can be configured by an AP can allow for managing channel access with channel access priority in mind, while also minimizing the risk of frame collisions.

Although various systems and methods have moved towards addressing these problems with new MU schemes and setting fixed values for these parameters, for the sake or reducing collisions, channel access from some client devices can be left unprioritized (or some client devices can remain handicapped in terms of access to the channel), or when prioritized, the collision risk may still be too great. Therefore, in accordance with various embodiments, the present disclosure allows for an intelligent means of dynamically adjusting these parameters based on the needs of the WLAN devices, but also the BSS as a whole.

Accordingly, disclosed are methods and systems for dynamically configuring channel access priority. Moreover, disclosed are methods and system for prioritizing channel access on uplink for UL MU data capable devices (such as 802.11ax client devices) over legacy, or non-UL MU data capable devices, even if these devices choose to also employ SU means of channel access. These systems and methods can include dynamically modifying one or more of these parameters. Methods and systems disclosed herein can also include dynamically adjusting these parameters based on the number of active MU capable client devices, and/or the total number of active client devices in the BSS. In this way, the dynamic system and methods allow for the balance between competing needs to be preserved, such as priority and speed of WLAN device(s) and the requirements of the BSS.

Figure 1A:
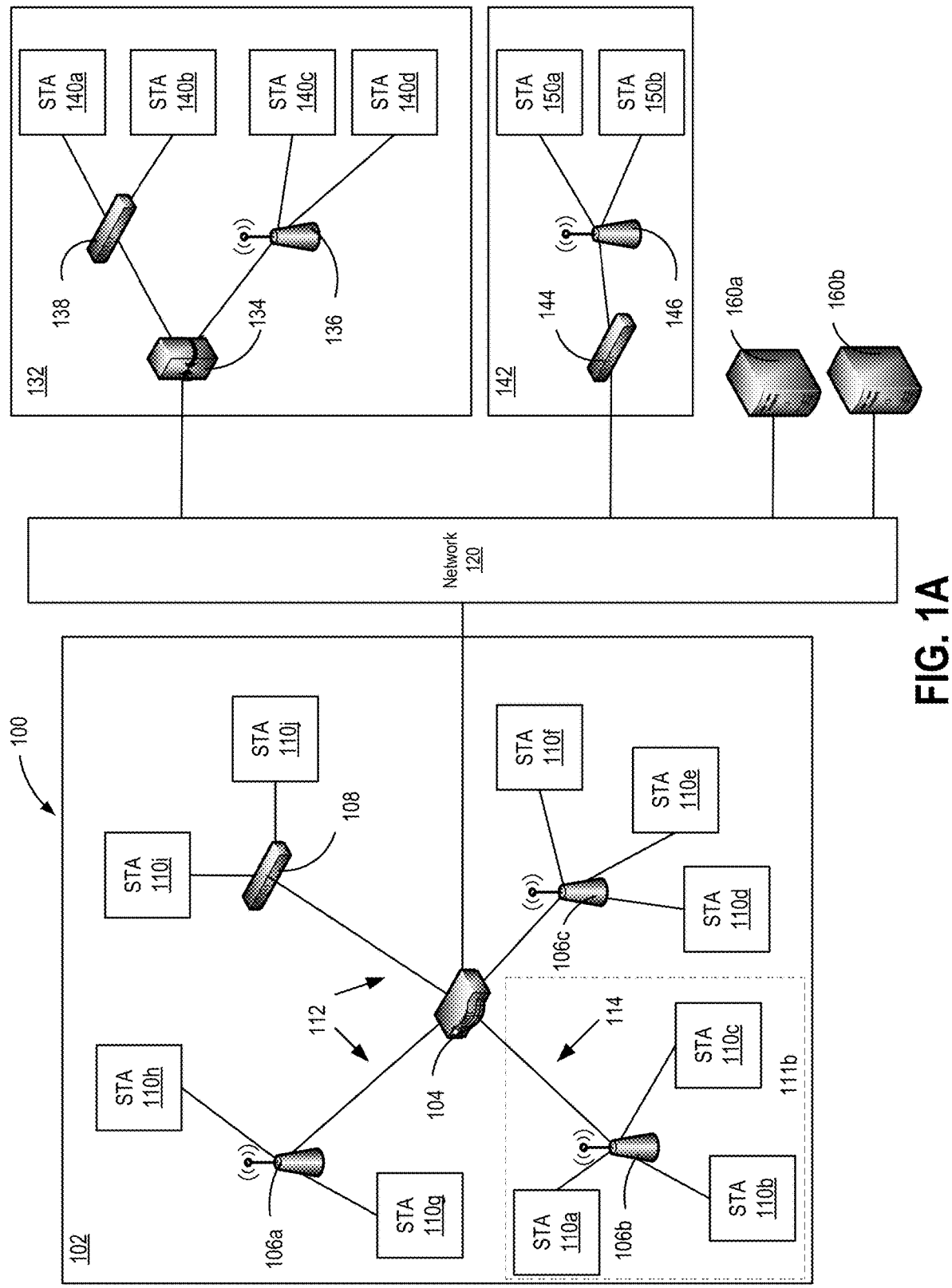
FIG. 1A illustrates an example wireless network deployment in which channel access can be dynamically prioritized for Multi User (MU) data capable WLAN devices (such as 802.11ax WLAN devices) in a Basic Service Set (BSS) with mixed clients devices.

Before describing embodiments of the disclosed systems and methods in detail, it is useful to describe an example network installation with which these systems and methods might be implemented in various applications. FIG. 1A illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices (STAB) 110) and possibly multiple physical or geographical sites 102, 132, 142. Sites 102, 132, 142 as shown can each correspond to one or more BSS. For example, site 102 can include BSS 111b. BSS 111b can include and can be serviced by AP 106b. BSS 11b can include client device 110a-c. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices/STAs 110a-j. Using a connection to a switch 108 or AP 106a-c, a client device/STA 110a-j may access network resources, including other devices on the (primary site 102) network and the network 120.

As used herein, a client device (STA) refers to a device including a processor, memory, and I/O interfaces for wired and/or wireless communication. Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

The BSS is in effect WLAN subset or cell, which can include one or more WLAN devices, such as one or more client devices (STAB), and/or one or more APs. Individual WLAN devices can become associated with a particular BSS. Thus WLAN devices (such as client devices) can be associated with an AP of the BSS. Multiple client devices may be attempting to receive and/or transmit frames in or around the same time, in a multi-user (MU) environment. For example BSS 111b can be a MU environment, and client devices 110a-110c can be attempting to receive and/or transmit frames in or around the same time.

Client devices can access one or more transmission channels (e.g. by radio) by transmitting and/or receiving frames according to one or more standard or non-standard protocol. The standard protocol may be configured for MU use cases. For example, the standard protocol may allow for sequential transmission so as to avoid frame collisions. For example, a WLAN protocol can provide for QoS priority, and/or collision avoidance. For example, the 802.11 standard allows for channel access by client devices according to collision avoidance (CSMA/CA) approach. The CSMA/CA approach includes access-category specific, STA Enhanced Distributed Channel Access (EDCA) parameters which will be discussed below. The CSMA/CA approach can generally be referred to as a single user (SU) approach, because the goal is to cause transmission of frames at different times. If the channel is accessed simultaneously under that approach, this can generally lead to frame collision.

As another example, the 802.11ax standard allows for client devices to access the channel simultaneously (i.e. at or around the same time, without collisions). Thus, this can be referred to a MU and/or high efficiency approach. Devices employing such schemes can be referred to as MU data capable WLAN devices or high efficiency WLAN devices (or 802.11ax aware with reference to one example standard). This MU method of channel access by client devices in the UL can be based on receipt of a trigger frame which generally schedules the client device to transmit in the UL. This is generally called a scheduled based, and/or trigger based UL MU transmission, however it is not necessary for this transmission to be preceded by a trigger. The trigger based UL MU transmission from the WLAN device can be completed immediately upon receipt of the trigger (e.g. after sensing the channel, or after a short inter-frame space (SIFS)). Generally, as described herein, these client devices can be scheduled client devices, 802.11ax client devices, high efficiency client devices, and/or MU capable client devices. These MU capable client devices can also access the channel according to a collision avoidance or SU scheme. For example, client devices can elect to access the channel by the collision avoidance approach (e.g. by EDCA contention) and effectively "double dip" for access to the channel by also attempting to access the channel by MU means (e.g. after receipt of a trigger frame).

Within the primary site 102, a switch 108 is included as one example of a point of access to the network established in primary site 102 for wired client devices/STA 110i-j. client devices 110i-j may connect to the switch 108 and through the switch 108, may be able to access other devices within the network configuration 100. client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces. Although the controller 104 is picture separately from APs 106a-c, the APs 106a-c can include one or more controller 104 functionality. The division of the functionality can depend on the MAC mode. For example, in some embodiments (e.g. for local MAC mode), the controller 104 functionality is part of the APs106a-c and/or the controller 104. In some embodiments (e.g. for split MAC mode) the controller 104 functionality can be split among the controller 104 and one or more of the APs.

Wireless APs can support UL and/or DL of frames according to one or more protocol. For example, the 802.11 standard allows for channel access according to the CSMA/CA approach (e.g. with access-category specific EDCA parameters which will be discussed below), as will be discussed below and as previously mentioned, does not allow for client devices to transmit simultaneously (i.e. at or around the same time), thus it can be referred to as single user (SU) approach.

As another example, the 802.11ax standard allows for channel access by WLAN devices, by a means in addition to the traditional CSMA/CA approach. The additional means can allow for multiple client devices to access the channel simultaneously (i.e. at or around the same time). This approach can be enabled by central scheduling (e.g. by AP, such as AP106a-c). This approach can be based on the AP accessing the medium (e.g. by using the traditional CSMA/CA approach) and transmitting (i.e. in the DL) a trigger frame to specific client devices. The trigger frame can schedule certain clients to transmit in the UL simultaneously (i.e. at or around the same time). A trigger frame can be used generally for OFDMA, MU-MIMO, and/or Trigger-based Random Access. The trigger frame can contain scheduling information (e.g. resource unit (RU) allocations) for client devices, and/or modulation and coding scheme (MCS) that can be used for each of the client devices.

For example, for OFDMA, each client device can be allocated one or more RUs (e.g. subcarrier bandwidths), and thus multiple client devices in an MU environment can transmit simultaneously (e.g. at or around the same time).

For another example, for UL MU-MIMO, an AP may simultaneously (i.e. in or around the same time) receive from multiple client devices. Whereas OFDMA separates receivers to different time-frequency RUs, with MU-MIMO the devices are separated to different spatial streams. In 802.11ax, MU-MIMO and OFDMA technologies can be used simultaneously. To enable UL MU transmissions, the AP transmits the trigger frame which contains scheduling information (e.g., for the various MU schemes). Furthermore, the trigger frame also provides synchronization for an uplink transmission, since the transmission (i.e. from the STA) starts after SIFS at the end of the trigger frame.

Consequently, a BSS can have a mixed population of UL MU data capable client devices (e.g. 802.11ax aware client devices or high efficiency client devices) and legacy, non UL MU data capable (i.e. non 802.11ax aware) client devices. In addition, UL MU data capable WLAN devices can choose to forgo UL MU transmissions (and thus chose to transmit by SU means, e.g. CSMA/CA). In such BSS with mixed client device populations, there can be one or three types of transmissions in the UL:

a. MU from UL MU data capable client devices (e.g. trigger based for 802.11ax MU-MIMO and OFDMA);

b. SU (e.g. CSMA/CA (e.g. with EDCA parameters)) by UL MU data capable client devices (such as 802.11ax aware client devices);

c. SU (e.g. CSMA/CA (e.g. with EDCA parameters)) by non UL MU data capable client devices (e.g. non 802.11ax aware client devices).

It can be useful for the AP to manage traffic flow and/or channel access so as to minimize frame collisions in the mixed client population, but also to respect WLAN device requested and/or enterprise requested priority (such as channel access priority).

As used herein, active WLAN devices are referred to as active WLAN devices that are actually transmitting (or attempt to transmit), as contrasted with dormant WLAN devices which can be associated with an AP, but not transmitting (or not attempting to transmit). As used herein, active client devices are client devices that have one or more frames or data in a buffer/transmission queue to be transmitted, for the channel.

As used herein, HE-clients can refer to active high-efficiency client devices that can support UL MU for data frames (and/or do actually use or attempt to use UL MU for data frames). HE-client-density can refer to the ratio of active HE-clients over the total number of active clients in the BSS (i.e. UL MU data capable and non UL MU data capable.) If HE-clients refer to active high efficiency client devices that can support UL MU for data frames and do attempt to use UL MU for data frames, the rest of the client devices that are not HE-clients can include all legacy client devices (e.g. non UL MU data capable client devices), and the UL MU data capable (e.g. 802.11ax aware) client devices that disable (or chose not to employ) UL MU for data frames.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

An AP generally refers to a networking device that allows a client device or STA to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 WiFi interfaces, although examples of the disclosure are not limited to such interfaces. An AP can include memory, including read-write memory, and a hierarchy of persistent memory such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

It should be noted that APs, such as AP 130, AP 132, and AP 134 are enabled to implement VAPs, namely, support for one or more multiple distinct SSID values over a single AP radio with unique media access control (MAC) addresses per SSID (i.e., BSSID). As is known, an SSID is a field between 0 and 32 octets that may be included as an Information Element (IE) within management frames. In the context of the 802.11 standard, management frames supporting the SSID IE include the beacon, probe request/response, and association/reassociation request frames. In one embodiment, an AP supports VAPs using multiple BSSIDs. Each beacon or probe response may contain a single SSID IE. The AP sends beacons for each VAP that it supports at a beacon interval (e.g., 100 ms), using a unique BSSID for each VAP. The AP responds to probe requests for supported SSIDs (including a request for the broadcast SSID) with a probe response including the capabilities corresponding to each BSSID. In one embodiment, an AP may advertise up to a given number (e.g., 16) of beacons, each with a different BSSID to provide the VAP support. Each VAP may have a unique MAC address, and each beacon may have a network name.

APs as discussed herein can determine if client devices are MU data capable client devices (e.g. 802.11ax aware) and/or high efficiency devices. For example, 802.11ax client devices may be UL MU capable devices, and may choose to disable UL MU. AP's as discussed herein can determine which MU data capable client devices chose not to employ MU data schemes, (i.e. employ SU schemes and/or disable MU). APs as discussed herein can determine the number of client devices associated to the AP which are MU data capable, UL MU capable, and/or chose to employ (or not) MU schemes. AAPs as discussed herein can determine if client devices are not MU data capable (i.e. not 802.11ax aware, non he-devices, or legacy client devices). APs as discussed herein can determine the number of client devices associated to the AP which are not MU data capable. APs as discussed herein can determine the total number of client devices associated to the AP (and/or the BSS size).

It should be understood that wireless communications as contemplated herein may involve the configuration of one or more parameters which determine a QoS for communication by or with WLAN devices, such as, e.g., APs. Parameter values determine how frequently WLAN devices request access to a radio frequency channel and/or use a radio frequency channel. Parameter values for a particular WLAN device that result in a radio frequency channel (or an overlapping portion of two radio frequency channels) being accessed more often by that particular WLAN device relative to other WLAN devices may be referred to herein as aggressive parameter values. In addition, parameter values that are more aggressive relative to default or industry-standard parameter values for obtaining channel access may also be referred to herein as aggressive parameter values. Parameter values for a WLAN device that result in a channel being accessed less often for that particular device, may be referred to as less aggressive, or a conservative parameter values. Examples of parameters are Enhanced Distributed Channel Access (EDCA) parameters (or legacy EDCA parameters), MU EDCA parameters (EDCA parameters that can be tailored for MU capable WLAN devices), and Hybrid Coordination Function Controlled Channel Access (HCCA) parameters.

EDCA Parameters

Values for at least some EDCA parameters may depend on values for one or more other EDCA parameters. Values for EDCA parameters may depend on which WLAN device accesses the medium (e.g. client devices, or the AP), and/or the direction (UL or DL). EDCA parameters may include, but are not limited to the following:

a. Access Category (AC)—An access category parameter refers to one of a voice AC, a video AC, a best effort AC, and a background AC. There may be more ACs as described in the 802.11 standard and each AC may be associated with a different QoS priority level.

b. Arbitration Inter-Frame Spacing (AIFS)—A non-random time interval before starting random backoff, which can depend on the AC. It is a method of prioritizing one AC over the other. In some standards, this can correlate to a time interval between frames.

c. Minimum Contention Window (CWmin)—Input to an algorithm that determines the initial random backoff wait time for retry of a transmission in response to failed attempt (for example, due to unavailability of a radio frequency channel). Such an algorithm may be included as part of collision avoidance schemes such as CSMA/CA. For example, the WLAN device can sense the channel, and then backoff and wait for the random back off wait time before attempting a transmission. The contention window can refer to a range of possible values from which a random value for the random backoff wait time can be selected. Generally, a smaller contention window can be more aggressive (thus favor prioritized WLAN device channel access priority). A larger contention window is generally less aggressive (more conservative), which can generally allow for lower probability of collisions. The contention window can have a minimum and a maximum value. The minimum value is typically the initial value. The contention window can increase with each successive collision and/or channel access attempt. The maximum contention window is typically the maximum contention window size, (i.e. the contention window size before attempts are aborted).

In binary exponential random backoff algorithms, the contention window can be calculated by the equation CW=2^N−1. The contention window may depend on the access category, and/or if there has been a prior collision during a prior transmission attempt. In some embodiments, for example, for WLAN devices with traffic in the Best Effort or Background Access Categories, the starting value of N can be 4. Thus, in these examples where the starting value of N is 4, CWmin=15. As previously discussed, the random backoff wait time may be increased when a frame transmission is unsuccessful due to the channel being unavailable for the transmission.

Generally, a lower value for CWmin may be more aggressive than a higher value for CWmin. A higher value for CWmin may be more conservative than a lower value for CWmin.

d. Maximum Contention Window (CWmax)—can correspond to the maximum random backoff wait time. As previously discussed, the random backoff wait time may be increased when a frame transmission is unsuccessful. In a binary exponential random backoff algorithm, the contention window can be calculated by the equation CW=2^N−1. In some non-limiting embodiments, client devices (such as 802.11 client devices) can attempt to re-transmit data up to 7 times before giving up and dropping the frame. In the 802.11 standard, with each collision (unsuccessful attempt of transmission), the value of N is incremented until a successful transmission occurs. Thus N can increase by 1 with each subsequent attempt and be reset (e.g. to CWmin) when a successful transmission occurs.

In one non-limiting example where N=4 (e.g. for WLAN devices using the Best Effort or Background QoS Access Categories, CWmin can be 15 (N=4) and CWmax can be 1023 (N=10). This example is reflected in the table below.

TABLE 1

| Attempt # | N Value | Contention Window ($2^N$−1) |
|---|---|---|
| 1 | 4 | 0-15 |
| 2 | 5 | 0-31 |
| 3 | 6 | 0-63 |
| 4 | 7 | 0-127 |
| 5 | 8 | 0-255 |
| 6 | 9 | 0-511 |
| 7 | 10 | 0-1023 |
| 8 | 10 or NA | 0-1023 or Give Up. (Dropped Frame) |

Generally, a lower value for CWmax may be more aggressive than a higher value for CWmax. A higher value for CWmax may be more conservative than a lower value for CWmax.

e. Maximum Burst—The maximum burst length allowed for packet bursts (collection of multiple frames transmitted without header information) on the wireless network.

f. Transmission Opportunity (TXOP) Limit—An interval of time when a client device has the right to initiate transmissions toward an Access Point and send as many frames as possible.

g. Beacon Interval—An interval of time between beacon frame transmissions. A beacon frame is one of the management frames in IEEE 802.11 based WLANs and includes information about the network. A beacon frame broadcasted by an access point may include values for parameters associated with that access point.

h. DTIM Period—A number that determines how often a beacon frame includes a DTIM. A value of the DTIM is included in each beacon frame. A DTIM is included in beacon frames to indicate to the client devices whether the access point has buffered broadcast and/or multicast data waiting for the client devices.

i. User Priorities (UP)—Another QoS related parameter that can map to AC.

MU EDCA Parameters

MU EDCA parameters can include one or more of the legacy EDCA parameters mentioned above, but not necessarily configured to the same values thereof. Values for the MU EDCA parameters can be tailored to MU channel access schemes. The values for one of the MU EDCA parameter may depend on values for another (i.e. another type) of the MU EDCA parameters. For example, the values for MU EDCA contention window, e.g. CWmin, may depend on the value for MU EDCA AC. The values for the MU EDCA parameters may depend on which WLAN device is accessing the channel (e.g. AP, client devices), and/or the direction (DL or UL).

One or more legacy EDCA parameters, if included in the MU EDCA parameters, can have values set to different, MU scheme (e.g. ODFMA, MU-MIMO) tailored values. One or more standard, such as the 802.11ax standard, provides separate MU EDCA parameter set that can be temporarily used by MU capable client devices (such as 802.11ax aware client devices) after they have scheduled UL. For example, the MU EDCA parameters may be included as part of the trigger frame that can be received from the AP by the client device. As another example, receipt of the trigger frame or another scheduling frame, can trigger the switch to MU EDCA parameters.

In embodiments, the MU EDCA parameters are used by MU data capable devices that attempt to access the channel by SU means (e.g CSMA/CA approach with MU EDCA parameters instead of the legacy EDCA parameters). Such MU data capable devices may have received a trigger frame, or otherwise received scheduling information for MU transmission. Such MU data capable devices may attempt to access the channel by both MU means (e.g. based on the trigger frame or otherwise based on scheduling information), and attempt to access the channel by SU means (e.g. by CSMA/CA approach using the MU EDCA parameters). These MU data capable WLAN devices may end up accessing the channel by the means which is more favorable to the WLAN device. For example, if the random backoff wait time is longer than the otherwise scheduled or trigger based transmission time by MU means, the WLAN device could elect to access the channel by MU means. As another example, if the random backoff wait time is shorter than the otherwise scheduled or trigger based transmission time by MU means, the WLAN device could elect to access the channel by SU means.

The MU EDCA Parameter set can include a MU EDCA timer. A value for the MU EDCA timer can determine the duration after a scheduled UL transmission for which the MU EDCA parameter set (or portion thereof) take effect. Once MU EDCA timer expires, the WLAN device can revert back to the EDCA parameter set (i.e. legacy EDCA parameters), or otherwise configure the MU EDCA parameter set to have the same values as the legacy EDCA parameter set.

MU EDCA parameters, such as MU EDCA timer, can be programmed by the AP (or another scheduler WLAN device), or the controller 104. In embodiments, MU EDCA parameters can be dynamically selected, modified, or adjusted.

For example, the value for the MU EDCA timer can be dynamically adjusted. The value for the MU EDCA timer can be based on the values of other MU EDCA parameters, the values of EDCA parameters, the number of client devices associated to the AP, the number of active client devices associated to the AP, the number of client devices part of the BSS, the number of active client devices part of the BSS, the type of MU transmission (e.g. OFDMA, MU-MIMO etc.) the number of HE-clients, the RU size, the number of available RUs, the transmission direction (e.g. DL or UL), the average air-time for each UL and/or MU transmission, the queue-depth (i.e. for data at one or more buffer(s) of client devices and/or for a transmission queue, e.g. measured in bytes), the number of buffers queued, and/or the UL and/or DL time. In embodiments, the value for the MU EDCA timer can be determined by the amount of data buffered at the he-clients, and/or the number of he-clients (i.e. in the BSS and/or associated to the same AP). For example, if the BSS has N client devices that are scheduled at a time (on average or absolute) and each of the UL schedules takes an air-time of t (e.g. on an average), then the value for the MU EDCA timer, T, can be such that it is greater than or equal to N*t/n. The air time (e.g., UL air time), t, in turn, can be based one on the number of buffers queued at the WLAN devices (e.g. at the client devices for UL) and the data-rate programmed for the transmissions.

In other words, a lower bound on the value for the MU EDCA timer can be determined such that the AP can schedule each of the HE-clients at least once before the MU EDCA timer expires. If the MU EDCA timer value is higher than that (i.e. longer than the time it takes to schedule each of the he-clients at least once, or higher than the lower bound), this would allow the he-clients to have MU EDCA-based SU access to the channel for a longer duration.

In some embodiments, the value for the MU EDCA timer can be determined based on the amount of data buffered at the active high efficiency client devices and the number of high efficiency client devices, such that each of the high efficiency client devices can be scheduled once before the expiration of the MU EDCA timer.

As previously mentioned, MU capable (e.g. 802.11ax aware) client devices can elect to access the channel (e.g. in the UL) by traditional collision avoidance schemes (such as CSMA/CA approach) and/or to access the channel by MU approached (such as MU-MIMO, CFDMA, or generally scheduled or trigger based approaches). MU EDCA parameters can be specifically used by these devices which elect to do both (effectively double-dipping on channel access). Thus MU EDCA parameters can be used for SU access by WLAN devices which specifically elect to use SU means even though they are MU capable.

As previously mentioned, in embodiments, values for MU EDCA can be dynamically adjusted and/or modified. The value for the MU EDCA parameters can be based on the values of other MU EDCA parameters, the values of legacy EDCA parameters, the number of client devices associated to the AP, the number of active client devices associated to the AP, the number of client devices part of the BSS, the number of active client devices part of the BSS, the type of MU transmission (e.g. OFDMA, MU-MIMO etc.) the number of he-clients, the RU size, the number of available RUs, the transmission direction (e.g. DL or UL), if there has been a prior collision (or generally the transmission attempt number).

In some embodiments, the values for MU EDCA parameters are the same as legacy EDCA parameters. For example, values for parameters in the MU EDCA parameter set can be set equal to values for the legacy EDCA parameters when the number of UL MU-capable client devices (e.g. 802.11ax capable client devices) exceed the total number of active client devices less the number of UL MU-capable client devices. In some embodiments, values for parameters in the MU EDCA parameter set can be set equal to values for the legacy EDCA parameters when the number of UL MU-capable client devices (e.g. 802.11ax capable client devices) are equal to the total number of client devices less the number of UL MU-capable client devices.

In some embodiments, the values for MU EDCA parameters for MU capable client devices can be more conservative than the values of legacy EDCA parameters. In some embodiments, the values for MU EDCA parameters for MU capable client devices can be more conservative than legacy EDCA parameters, but only for such devices which elect to access the channel by both MU means (e.g. trigger frame based or scheduled based), and SU means (such as CSMA/CA approach). Thus, the MU EDCA values can be more conservative for those client devices which are effectively double dipping on channel access, than the rest of the client devices, with the aim to reduce collision for legacy EDCA. This can be a fairness policy for the BSS, and bring fairness between 802.11ax clients that have MU access (such as scheduled or trigger based access) as compared to MU capable (e.g. 802.11ax aware client devices) or non-MU capable client devices (e.g. non 802.11ax aware client devices) that do not have MU access (i.e. elect to forgo such access or otherwise are not MU capable).

In some embodiments, values for the MU EDCA parameters are set to be more aggressive than legacy EDCA parameters. For example, it may be beneficial to maintain more aggressive than legacy EDCA parameters for better performance (or more prioritized channel access) for WLAN devices which access the channel by MU means (e.g. MU capable devices, including if they elect to "double dip" on channel access by also employing CSMA/CA channel access approaches). In such embodiments, it may be preferable to not penalize or handicap client devices which do elect to access the channel by multiple means. Thus, a dynamic approach to adjusting MU EDCA parameters may consider both BSS requirements, but also individual client device priority or performance.

In some embodiments, a dynamic approach considers the number of total active client devices, but also the number of MU capable WLAN devices that can support MU transmissions.

In some embodiments, the MU EDCA parameters can be set to more conservative, the same as, or more aggressive than legacy EDCA parameters, depending on the Access Categories (or other QoS scheme). For example, for some enterprise critical applications, such as business video, do not have to be handicapped or penalized for "double dipping", whereas other background applications could be. For example, when the AC is higher priority, such as for video, as compared to lower priority (such as for background), legacy EDCA parameters can be set to more aggressive.

Values for MU EDCA parameter(s) can be set based on the ratio between total number of active client devices (i.e. the total number of active client devices, including UL MU-capable devices such as 802.11ax aware client devices, and UL MU non-capable devices, such as legacy 802.11 devices) and UL MU-capable client devices (such as 802.11ax capable client devices).

The MU EDCA parameter set can be adjusted based on negotiations between the AP and the client devices, and/or based on a channel access history for the client devices. For example, the AP can set to more aggressive the MU EDCA parameters (such as increase the MU EDCA timer) for a client device which had experienced longer channel access wait times in prior channel access.

Values for parameters in the MU EDCA parameter set can be based on the ratio of active UL MU capable client devices to the total number of client devices (i.e. UL MU capable and UL non-capable client devices) associated to an AP. Values for parameters in the MU EDCA parameter set can be based on the ratio of active UL MU-capable client devices to the total number of client devices (i.e. UL MU capable and UL non-capable client devices) within a BSS. Values for parameters in the MU EDCA parameter set can be based on the total number of WLAN devices and the proportion that can support UL MU for data frames. Values for parameters in the MU EDCA parameter set can be based on the he-client-density.

he-client-density (or another ratio or density described herein) can be compared to a density threshold. If the he-client-density is lower than the density threshold, values for the MU EDCA parameters can be more aggressive than the EDCA parameters. For example, the density threshold can be at, below, or around 50%, e.g. 52%, 51%, 50%, 49%, 45%, 40%, 35%, 30%, 25%, 10%, 05%, 01%. This can allow for HE-clients to access the channel more often. Moreover, the MU EDCA timer can be set for longer (thus allowing the WLAN device to have more aggressive parameters for longer).

In embodiments, values for MU EDCA parameters can be set to be more aggressive than the EDCA parameters, when the he-client density (or another ratio or density described here) is at or below a first threshold. The values for MU EDCA parameters can be set to be even more aggressive (i.e. compared to the values when the density is at the first threshold) when the he-client density (or another ratio or density described here) is at or below (i.e. does not exceed) a second density threshold value that can be lower than the first density threshold value. In embodiments, It can be understood that there can be one or more, two or more, three or more, four or more density threshold values. Moreover, the MU EDCA timer can be set for even longer (thus allowing the WLAN device to have more aggressive parameters for even longer).

Figure 1B:
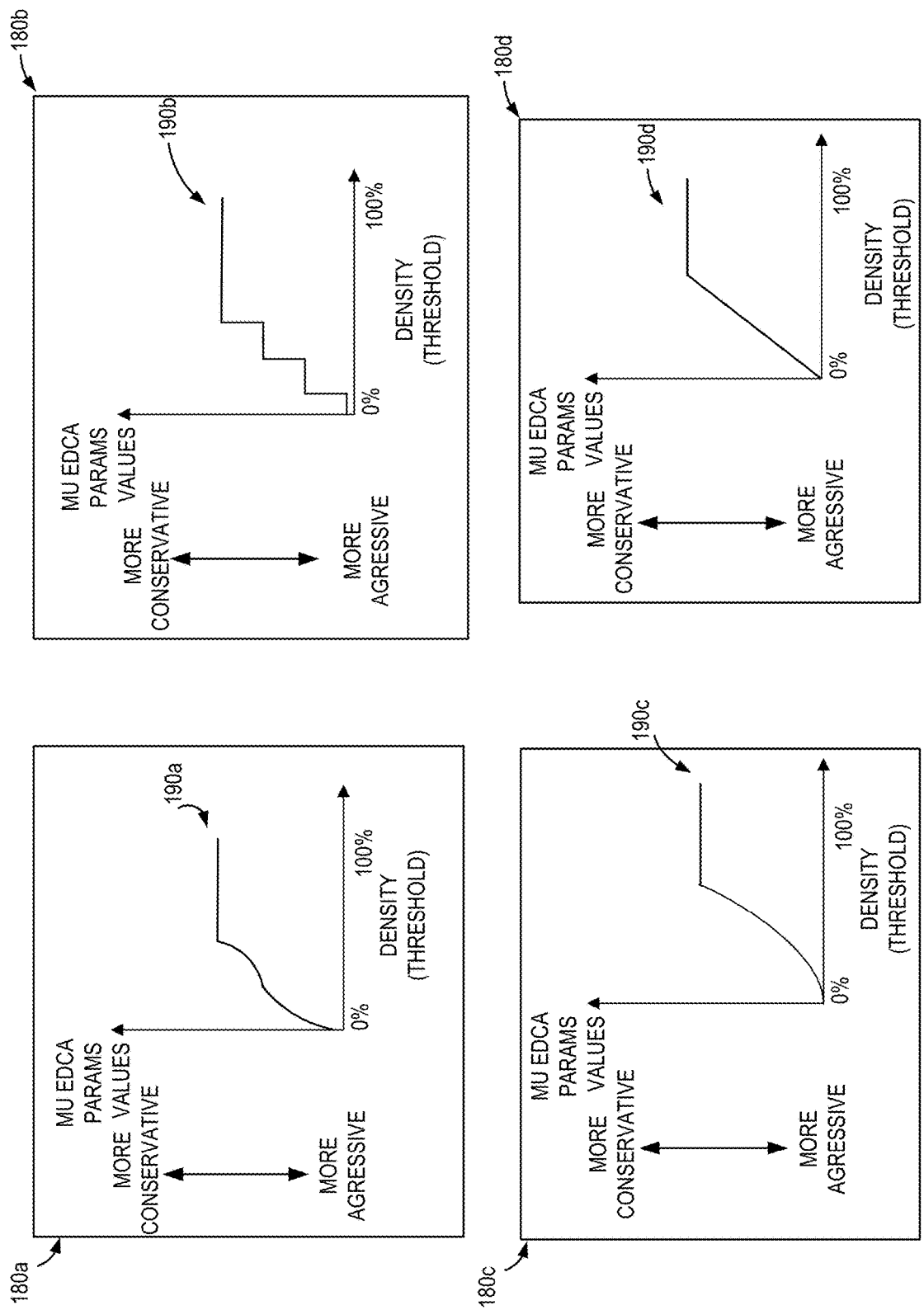
FIG. 1B illustrates example values for parameters based on the density of a type of WLAN device in a BSS with mixed client devices.

FIG. 1B illustrates example values for parameters (e.g. MU EDCA parameters) based on the density of a type of WLAN device in a BSS with mixed client devices. For example, the density can be he-client density as described herein, and/or the ratio of (active) MU UL data capable WLAN devices associated to the AP, and all the (active)

WLAN devices associated to the AP. As shown in the graphs 180a, 180b, 180c, 180d, the values can be set to be more conservative and/or more aggressive (on an aggressiveness scale, which can relate to, for example the access to the channel). The values can be based on one or more thresholds on the density. Although specific threshold values are not shown, it is understood that there can be multiple thresholds. Plotting the values for MU EDCA parameters, for example, with respect to the density, it can be seen that the values for MU EDCA parameters can follow one or more curves, such as curves 190a, 190b, 190c, 190d. The curves can follow any combination of type of curve (and/or function), for example, step, linear, exponential, non-linear, logarithmic, logistic, etc. It can be understood, that the increment to the aggressiveness of the parameters can be some function of the density. For example, once the density goes below and/or at a first threshold, the incremental aggressiveness can follow a first function (such as a linear function). As another example, the incremental aggressiveness can be flat above that same threshold (thus no increment to the aggressiveness). The examples of FIG. 1B are merely non-limiting examples.

The lower bound on the MU EDCA parameters can be set by the number of he-clients. Making the lower bound on the MU EDCA parameters more aggressive could cause more frame collisions for the he-clients (e.g. because of a smaller initial contention window). This could be detrimental to channel utilization by those he-clients, but also by other WLAN devices. For example, if the BSS size (e.g. in terms of the number of active client devices, the number of active he-devices, and/or the number of client devices associated to the AP) is quite small (e.g. 1-15 (active) he-clients), then being aggressive with MU EDCA parameter set might more feasible (i.e. in terms of less probability of collisions) than with a larger BSS size (e.g. 100-200 active he-clients). In generally, the probability of collision is lower with a lower number of (active) client devices, thus MU EDCA parameters can be set more aggressive. With a larger BSS size, the absolute number of he-clients can warrant the MU EDCA parameter set to be less aggressive than otherwise.

As previously discussed, MU EDCA parameters and/or legacy EDCA parameters can depend on values for QoS related parameters (e.g. AC and/or UP). In embodiments, values for the MU EDCA parameters and/or legacy EDCA parameters can be set to not be more aggressive (i.e. can be equal to, less aggressive, or more conservative) than values for the MU EDCA parameters (and/or legacy EDCA parameters) for the highest priority AC or UP. For some of these embodiments, values for the MU EDCA parameters can be more aggressive than the legacy EDCA parameters if the he-client-density is lower than 50%. In some embodiments, MU EDCA parameters and/or legacy EDCA Parameters can be more aggressive in the DL (e.g. from AP) than in the UL (e.g. from the client device). For example, it may be preferable for the AP to set its own aggressive parameters for transmitting trigger frames. In some examples, the AP can set use the highest priority AC to send the trigger frames (or other scheduling information).

CWmin MU EDCA parameter can be half or less than half of the CWmin legacy EDCA parameter (e.g. in embodiments with binary exponential backoff algorithms). In other words, CWmin legacy EDCA parameter can be double or more than double the CWmin MU EDCA parameter. Thus, if there is one frame collision by MU capable devices employing SU channel access means (i.e. with MU EDCA parameters), the contention window for subsequent channel access attempts will be smaller (thus more aggressive), than the initial contention window for SU channel access by WLAN devices employing legacy EDCA parameters (e.g. non MU capable client devices). In other words, this can allow for more aggressive parameters for the MU WLAN devices (and thus prioritized channel access), even conceding one or more collision.

Moreover, CWMin MU EDCA parameter can be half or less than half of the CWmin legacy EDCA parameter, but only if he-client-density is below a certain density threshold. For example, the density threshold can be 5%, 10%, 15%, 20%, 25%, 30%, 40%, 45%, 50%, 51%, 52%. Moreover, CWMin MU EDCA parameter can be half or less than half of the CWmin legacy EDCA parameter, but only if the total number of active clients, or total of one or some type of clients (e.g. active he-clients), are below a certain threshold.

Similarly, CWmax MU EDCA parameter can be half or less than half of the CWmax EDCA parameter. Similarly, CWmin MU EDCA parameter can be one fourth or less than one fourth of the CWmax legacy EDCA parameter. This could allow for concession or two or more collisions, yet still maintaining aggressiveness for MU EDCA parameters (compared to legacy EDCA parameters).

In some of these embodiments, values for the MU EDCA parameters can be more aggressive than the legacy EDCA parameters if the he-client-density is lower than 50%. For example, if he-clients experience a collision between transmitted frames, and the contention window is doubled (i.e. for the subsequent transmissions), the aggressiveness can still remain better or at par with the aggressiveness of the larger client-base in the BSS, and not any worse. In other words, just one collision for one of the he-clients should not make its channel-access capability worse than that of the legacy (i.e. non MU data capable) client devices.

In embodiments, he-client-density can be equal to or greater than 50%. In this case, the number of he-clients can be equal to or greater than the number of non he-clients (i.e. non MU capable client devices). In these cases, values for parameters in the MU EDCA Parameter set can be set as the same as values for parameters in the legacy EDCA parameter set. This can ensure that while the he-clients get better channel-access (e.g. due to MU, scheduled and/or trigger based frame transmission in the UL), frame from these he-clients do not engage in more collisions due to aggressive channel access. Collisions may increase the MU contention window for the some of the he-clients to a point where the aggressiveness (or probability of channel access) may be worse (i.e. less aggressive) than the aggressiveness of legacy EDCA parameters for non MU capable client devices (e.g. non he-clients). In other words, if there is a collision of a frame for he-clients, the subsequent contention window can increase and become larger than the contention window for non MU capable client devices (i.e. non he-clients). Setting values for parameters in the MU EDCA Parameter set as the same as values for parameters in the legacy EDCA parameter set when the he-client-density is 50% or more, can prevent the favoring towards non MU-capable client devices, as compared to MU capable client devices that have experienced a prior collision for a frame.

In embodiments, when the he-client-density is 50% or more, values for parameters in the legacy EDCA parameter set can be more conservative, and values for parameters in the MU EDCA parameter set can be set the same as the values for parameters in the legacy EDCA parameter set; or values for parameters in the MU EDCA parameter set can be set the same as the values for parameters in the traditional legacy EDCA parameter set (the ones before making the parameter set conservative.

The WLAN protocol operates on channel access using collision avoidance (CSMA/CA) mechanism where any entity in the BSS can access the medium only after sensing the channel for a randomly chosen amount of time (random back-off) before initiating a transmission. The range of this randomly chosen time is determined by the legacy EDCA parameters programmed on the WLAN capable device. The legacy EDCA parameters are specific to an access-category and are advertised by the AP in a BSS. The client devices can be required to use them for their random back-off. In order for AP to have better access to the medium, the standard allows for the AP to use a separate set of AP-EDCA parameters that are in general more aggressive (more probability of gaining channel access) than the STA-EDCA parameters that it advertises. The AP-EDCA parameters are generally more aggressive than the STA-EDCA parameters so as to allow the AP to exert better access to the channel.

EDCA allows for prioritizing contention-based wireless medium (WM) access by classifying 802.11 traffic types by User Priorities (UP) and/or Access Categories (AC). EDCA is used by stations that support QoS in a QoS BSS to provide prioritized WM access. Similarly, two or more client devices can compete for access to the shared radio frequency channel. 802.11 Medium Access Control implemented with the Distributed Co-ordination Function (DCF) and Enhanced DCF Channel Access (EDCA) method can use a random back-off counter to help ensure that client devices do not transmit their data at the same time, but rather take turns to send their data one after the other. This can allow for collision avoidance in the UL.

When two (or more) 802.11 client devices both have data to send on the same channel and both have established that the channel is clear, both stations will select a random number, wait a pre-defined period called a DCF Interframe Space (DIFS) and then start counting from the random number to zero. The first station to reach zero transmits its frame. The other client devices can return to idle state until the first transmission is completed. Once the transmission is over and it is time for the second station to contend for the channel medium again, it will go through the process again and simply start counting down from where it left off. The first station, if it has more data to transmit, will select another random number and contend for the channel medium again.

If two (or more) 802.11 client devices select the same random numbers, this can lead to traffic collision. According to 802.11, for WLAN channel access, the 802.11 client devices would have to select new random numbers and rejoin the queue, however in order to try and reduce the probability of a future collision, the range of random numbers (the contention window) which can be selected increases, e.g. doubles. Thus, with each consecutive collision, the range of random numbers is increased, typically doubled. In some embodiments, and as alluded to above, ACs are defined for classifying network traffic. Each AC (configured for access to/from an AP) is associated with a corresponding set of parameter values. The transmission of frames classified under a particular AC can be transmitted according to the set of parameter values corresponding to that particular AC. That is, ACs can be likened to queues that an AP can populate with data, and from which that data can be transmitted. Typically, there are four types of ACs (described below) that can be assigned to different types of applications, each having its own particular QoS requirements/parameters. Moreover, once an AC is assigned to an application type, the manner in which traffic/data is queued in an AC, along with the manner in which traffic/data is taken out of the queue can be configured. It should be understood that a particular AC can be associated with one or more queues/sub-queues.

Table 2 below shows an example of four ACs (background (BK), best effort (BE), video (VI), and voice (VO)) and respective parameter values as configured for a first WLAN device.

TABLE 2

| AC | CWmin | CWmax | AIFS | Max. TXOP |
|---|---|---|---|---|
| Background (BK) | 15 | 1023 | 7 | 0 |
| Best Effort (BE) | 15 | 1023 | 3 | 0 |
| Video (VI) | 7 | 15 | 2 | 3.008 ms |
| Voice (VO) | 3 | 7 | 2 | 1.5404 ms |

In the above example, frames classified under the video category are transmitted by the first WLAN device using value 7 for CWmin, value 15 for CWmax, and value 2 for AIFS. A second WLAN device may be configured differently than the first WLAN device by using different parameter values.

Table 3 below shows an example of four ACs and associated parameter values as configured for a second WLAN device that is different than the first WLAN device.

TABLE 3

| AC | CWmin | CWmax | AIFS | Max. TXOP |
|---|---|---|---|---|
| Background (BK) | 15 | 1023 | 7 | 0 |
| Best Effort (BE) | 15 | 1023 | 3 | 0 |
| Video (VI) | 5 | 10 | 1 | 3.008 ms |
| Voice (VO) | 3 | 7 | 2 | 1.5404 ms |

In the above example (see table 2 and table 3), frames classified under the VI AC are transmitted by the second WLAN device using value 5 for CWmin, value 10 for CWmax, and value 1 for AIFS. The second WLAN device can be configured more aggressively than the first AP because the second AP has lower values for CWmin, CWmax, and AIFS. This can result in, for the second WLAN device, more frequent attempts to obtain channel access and more frequent transmission of frames.

Thus, the first WLAN device and the second WLAN device compete for access to the shared channel (such as a radio frequency channel). In an example, the first WLAN device attempts to transmit packets for a particular video stream at the same time the second WLAN device is transmitting a first set of packets for another video stream. Since the radio frequency channel is unavailable to the first WLAN device (the radio frequency channel is being used by the second WLAN device to send the first set of packets), the first WLAN device again attempts to transmit after a random period of time that is computed based on CWmin and/or CWmax (e.g. a period of time within 0 (or the SIFS time), and the largest possible time based on CWmax. The random period of time may be referred to herein as a random backoff time. However, the second WLAN device may be transmitting a second set of packets when the first WLAN device attempts again because the lower values for CWmin and CWmax used by the second WLAN device result in the second WLAN device requesting channel access more frequently than the first WLAN device. Furthermore, the second WLAN device transmits more frames per time period than the first WLAN device because the AIFS parameter value is lower for the second WLAN device. The difference in parameter values results in the second WLAN device using a channel, shared with the first WLAN device, for a larger percentage of time than the first WLAN device to transmit video data.

Figure 2A:
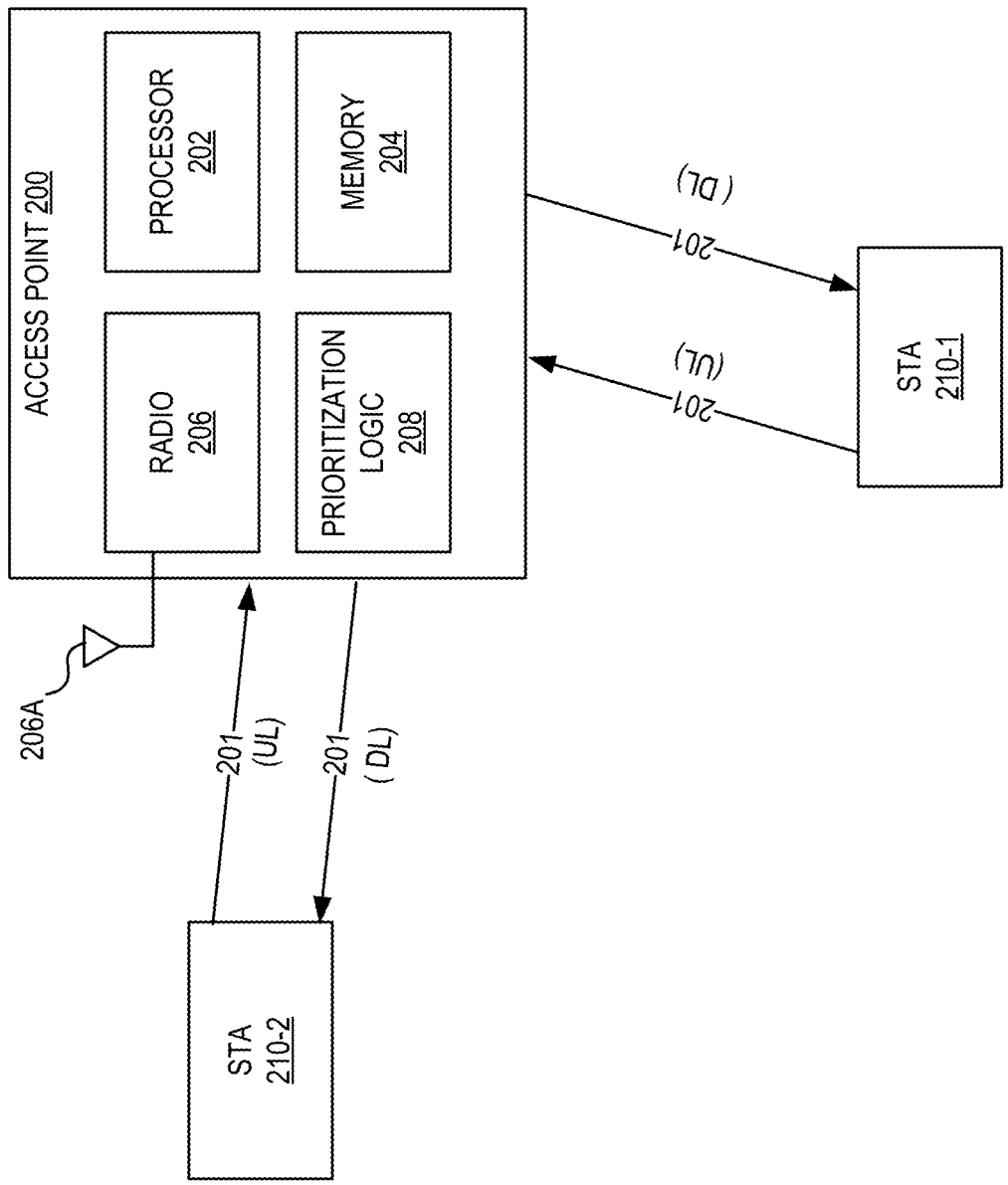
FIG. 2A illustrates an example access point (AP) in accordance with various embodiments, where channel access is dynamically prioritized for MU data capable WLAN devices (such as 802.11ax STAs) in BSS with mixed clients.

FIG. 2A is a schematic representation of an example AP 200 in accordance with one embodiment. AP 200 may be a network device that can include, e.g., one or more of: a processor 202, memory/data storage 204, a radio 206 (and corresponding antenna 206A), and prioritization logic 208.

Memory 204 may include a fast read-write memory for storing programs and data during the AP 200's operations and a hierarchy of persistent memory such as ROM, EPROM, and Flash memory for storing instructions and data needed for the startup and/or operations of AP 200. Memory 204 may store data that is to be transmitted from AP 200 or data that is received by AP 200. Memory 204 may store one or more of the various parameters (and values thereof) described herein. In some embodiments, memory 204 is a distributed set of data storage components. Although not shown, it should be understood that AP 200 may further include input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces.

Processor 202 is coupled to at least memory 204. Processor 202 may be any processing device including, but not limited to a MIPS-class processor, a microprocessor, a digital signal processor, an application specific integrated circuit, a microcontroller, a state machine, or any type of programmable logic array.

Radio 206 may be a 5 GHZ radio, a 2.4 GHZ radio, a 6 GHz radio, or other appropriate wireless communications component for effectuating wireless communications. Radio 206 may be configured to both transmit and receive data. Radio 206 may be dedicated to a communication channel 201. In some examples, communication channel 201 operates on a communication band (e.g., 5.0 GHz UNII band) and operates in accordance with a particular wireless specification (e.g., 802.11ax). For example, by operating in accordance with the particular specification such as IEEE 802.11ax, communication channel 201 can employ OFDMA, spatial reuse, MU-MIMO, and/or combinations thereof. By extension, a wireless client device/STA having a capacity of complying with the particular wireless specification can, in such examples, have the capacity for employing OFDMA, spatial reuse, UL MU-MIMO, and/or combinations thereof. It should be understood that AP 200 may have a plurality of radios (physical and/or logical), and may have dedicated or shared channels for each radio or group(s) of radios.

In some embodiments, prioritization logic 208 may include one or more functional units implemented using firmware, hardware, software, or a combination thereof for configuring parameters associated with AP 200 and/or client device/STA 210-1 for the transmission of data/frames to and from AP 200. Although, prioritization logic 208 is shown as being implemented on AP 200, one or more physical or functional components of the prioritization logic 208 may be implemented on a separate device, such as an AP controller, an example of which may be controller 104 of FIG. 1A.

Various embodiments can prioritize those frames being sent in the UL and/or DL direction based on, for example, adjusting values for one or more parameters as described herein, such as MU EDCA parameters and/or EDCA parameters. Various embodiments can dynamically prioritize those frame being sent from the client device/STA 210-1 and/or client device/STA 210-2, for example, by dynamically adjusting one or more parameters discussed herein (such as MU EDCA and/or EDCA parameters).

As illustrated in FIG. 2A, AP 200 may be receiving frames from STA 210-1, STA-2, (and/or other client devices, not shown) over communications channel 201 in the UL direction, while transmitting frames to client device/STA 210-1, client device/STA 210-2 (and other client devices, not shown), in the DL direction. As will be discussed in greater detail below with respect to FIG. 2B, one embodiment dynamically adjusts channel access priority (i.e. the values for of one or more parameters (such as MU EDCA) to provide for increased access to the one or more channels of the AP) by WLAN devices (e.g. AP 200, STA 210-1, STA 210-2, or another WLAN device not shown). The logic for dynamically adjusting channel access priority (e.g. by adjusting one or more parameters as described herein) can be included in prioritization logic 208.

It should be understood that various embodiments are able to effectuate dynamic adjustment of channel access priority under a variety of scenarios. For example, in some communication scenarios, there can be numerous client devices attempting to access the channel 201, (not shown), whereas in others, there can be a smaller number.

In some communication scenarios, for example, there can be mixed clients (i.e. employing a variety of channel access schemes and/or priority schemes). For example, in some communication scenarios, a plurality of client devices can be accessing (or attempting to access) the channel 201 by MU means, as compared to SU means. In some communication scenarios, some number of client devices accessing (and/or attempting to access) the channel 201 can be non-MU capable client devices (and/or legacy client devices). The same or another number of client devices accessing (and/or attempting to access) the channel 201 can be MU data capable client devices. Of those MU data capable client devices, some or all may end up accessing the channel 201 by MU means, whereas others end up accessing the channel 201 by MU means.

For example, client device/STA 210-1 can be a MU data capable device, whereas client device/STA 210-2 can be a non-MU data capable device. In the UL, it may be preferable to prioritize channel access for the client device/STA 210-1 (e.g. in the UL) as compared to client device/STA 210-2. In the UL, it may be preferable to prioritize channel access for client device/STA 210-1 over client device/STA 210-2, while still minimizing (or otherwise tailoring) a risk of frame collisions for client device/STA 210-1, 210-2, and any other WLAN device accessing the channel 201.

It should be understood that the prioritized channel access as disclosed herein need not be limited for use with APs/AP controllers, but may be used to prioritize channel access between non-AP devices that, e.g., operate in peer-to-peer or mesh network topologies. Hence, various embodiments disclosed and/or contemplated herein can be used to enhance the conventional channel access (i.e. wired and/or wireless), in two (UL and DL) directions relative to a given device (i.e. not necessarily a WLAN device). The dynamic prioritization of channel access can also be applied or leveraged on a per-application basis. That is, if a network, e.g., network 100 (FIG. 1A) or some portion(s) thereof become overloaded, certain applications may be afforded a higher priority than others.

As used herein, the term "traffic flow" can refer to a stream of data packets, e.g., segments, frames, or datagrams, that share the same channel. As used herein, the term "traffic flow" can refer to stream of data packets, e.g. segments, frames, or datagrams that same 5-tuple. It should be understood that the aforementioned 5-tuple can refer to a set of five different values that comprise a TCP/IP connection, and includes: source IP address; a destination IP address; a source port address; a destination port address; and the protocol in use (TCP/UDP).

The manner in which data is characterized may be specified, e.g., by a developer or other entity, such that deep packet inspection (described below) can be used to identify and classify this data traffic so that it can be assigned to an appropriate AC, (or other EDCA or MU EDCA parameter) and ultimately, as disclosed herein, prioritized.

It should be noted that deep packet inspection can be performed on traffic flows to determine whether the segments/datagrams for a particular traffic should correspond to an advertised priority. Moreover, deep packet inspection can be performed as part of one or more negotiation between the AP and client devices.

It can be understood that the prioritization of traffic, may depend on internal software/hardware implementation aspects/characteristics that can impact or change the scheduling of traffic. That is, by analyzing the metadata, AP implementations ensure that those traffic flows which correspond to a high-priority (e.g. higher priority channel access) are scheduled and/or otherwise transmitted with a commensurately higher priority over the air. This can be accomplished by adjusting one or more parameters, such as MU EDCA or EDCA parameters. For example, this can be accomplished by increasing the scheduling frequency for the traffic flows, and/or by ensuring that the AC in accordance with which data packets in a traffic flow are transmitted (and in accordance with any QoS requirement(s)).

Figure 2B:
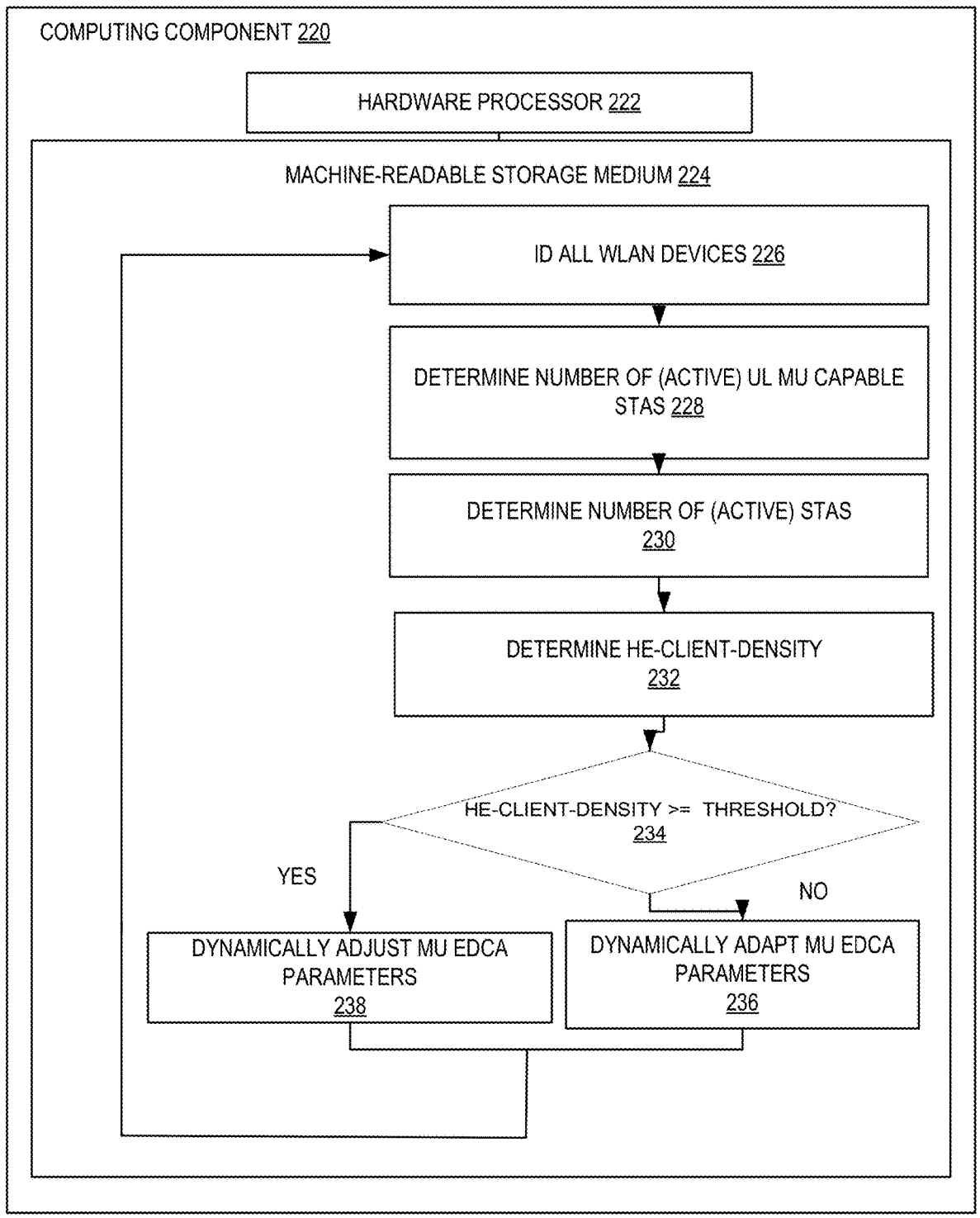
FIG. 2B illustrates an example computing component for effectuating dynamically prioritized channel access based on the number and/or types of STAs active on the channel in the AP of FIG. 2A, in accordance with one embodiment.

FIG. 2B is a block diagram of an example computing component or device 220 for prioritizing channel access in accordance with one embodiment. Computing component 220 may be, for example, a server computer, a controller, or any other similar computing component capable of processing data. In the example implementation of FIG. 2B, computing component 220 includes a hardware processor, 222, and machine-readable storage medium, 224. In some embodiments, computing component 220 may be an embodiment of a controller, e.g., a controller such as controller 104 (FIG. 1A), or another component of wireless network 100, e.g., an AP such as AP 106a (FIG. 1A), for example.

Hardware processor 222 may be one or more central processing units (CPUs), semiconductor-based microprocessors, and/or other hardware devices suitable for retrieval and execution of instructions stored in machine-readable storage medium, 224. Hardware processor 222 may fetch, decode, and execute instructions, such as instructions 226-238, to control processes or operations for prioritizing one or more channel access (such as WLAN device or application). As an alternative or in addition to retrieving and executing instructions, hardware processor 222 may include one or more electronic circuits that include electronic components for performing the functionality of one or more instructions, such as a field programmable gate array (FPGA), application specific integrated circuit (ASIC), or other electronic circuits. Instructions 226-238 can allow for dynamic and/or intelligent adjustment of channel access prioritization. Although instructions 226-238 are shown, it can be understood that the instructions can be performed in any order, without some of the instructions shown, and/or with the inclusion of other instructions not shown, and the instructions would still fall within the scope of the disclosure.

A machine-readable storage medium, such as machine-readable storage medium 224, may be any electronic, magnetic, optical, or other physical storage device that contains or stores executable instructions. Thus, machine-readable storage medium 224 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 224 may be a non-transitory storage medium, where the term "non-transitory" does not encompass transitory propagating signals. As described in detail below, machine-readable storage medium 224 may be encoded with executable instructions, for example, instructions 226-238.

Hardware processor 222 may execute instruction 226 to identify WLAN devices in BSS, such as WLAN devices associated to AP and/or sensing the channel. As discussed above, this can include determining which WLAN devices are sensing and/or accessing a channel, and/or which WLAN devices have received a beacon. Moreover, a more detailed identification (e.g. to determine one or more applications, can include examining one or more header of a packet or frame, and/or deep packet inspection can be performed on traffic flows.

Hardware processor 222 may execute instruction 228 to determine which of the WLAN devices (e.g. from those identified at execution of instruction 226) are MU data capable and/or high efficiency client devices. This can include determining which WLAN devices are associated to the BSS and/or AP, that are MU data capable and/or high efficiency WLAN devices. This can include determining which of the WLAN devices are 802.11ax aware devices and/or not 802.11ax devices. This can include determining the he-clients (e.g. the number of active high-efficiency clients that can support UL MU for data frames). This can include sending one or more trigger frames associated with MU schemes, such as based on the 802.11ax protocol.

Hardware processor 222 may execute instruction 230 to determine which of the client devices (e.g. from those identified at execution of instruction 226) are active client devices. Instruction 230 can include determining which of the WLAN devices are active WLAN devices. Instruction 230 can include determining which of the WLAN devices are or have indicated (e.g. to the AP) that they are in power save mode (or not). If a device is in power save mode, the device can be considered inactive (or not). Instruction 230 can include examining one or more DL and/or UL queue to determine which devices have frames and/or traffic in the queue to be transmitted. Instruction 230 can include examining the number of WLAN devices and/or which WLAN devices have data buffered at the WLAN device for transmission. Instruction 230 can include determining which (and how many) WLAN devices are sensing the transmission channel. Executing instructions 228 and/or 230 can include sorting the client devices (i.e. the client devices that were identified at step 226), e.g. by a requested priority, and/or the amount of data buffered. Executing instructions 228 and/or 230 can include determining which WLAN devices are not MU capable devices.

As described herein, one or more parameters can be dynamically adjusted, e.g. based on the number of active MU capable client devices, the he-clients, and/or the total number of active client devices in the BSS, such as a ratio thereof (he-client-density). The parameters can be adjusted based on the numerosity and/or the mix of client devices in the BSS (or associated to the AP).

Thus, hardware processor 222 can include instruction 232 for determining the he-client-density. He-client-density can be determined based on the total number of active client devices associated to the AP (and/or in the BSS) and the number of active high-efficiency client devices. He-client-density can be determined based on the total number of active client devices associated to the AP (and/or in the BSS) and the number of active MU capable client devices. He-client-density can be determined based on the total number of active client devices associated to the AP (and/or in the BSS) and the number of MU capable client devices. He-client-density can be determined based on the total number of client devices associated to the AP (and/or in the BSS) and the number of MU capable client devices. He-client-density can be determined by one or more determinations as described herein, including, for example, by calculating a ratio and/or making a comparison. For example, determining he-client-density can include calculating a ratio of the number of active MU capable client devices and the total number of active client devices in the BSS (and/or associated to the AP). As another example, he-client-density can be determined by comparing the total number of (active) client devices associated to the AP (or part of the BSS) to the number of active high-efficiency client devices, to the number of high-efficiency client devices, to the number of MU data capable devices, to the number of (active) MU data capable WLAN devices, to the number of (active) legacy (i.e. non 802.11ax) devices, and/or to the number of (active) MU data capable device which disable MU for data frames (e.g. in the UL) (or any combination, such as a summation, thereof).

Hardware processor 222 can include instruction 234 for comparing he-client-density to a density threshold. The threshold can be a percentage and/or number between 0 and 1. For example, the threshold can be 50%, 49%, 45%, 40%, 35%, 30%, 25%, 10%, 05%, 01%. In embodiments, the threshold can dynamically adjust depending on one or more information obtained when executing instructions 226-232, e.g. depending on the number of active high-efficiency client devices and/or the number of active client devices. The threshold can adjust dynamically depending on values for one or more parameters, such as values for EDCA parameters and/or MU EDCA parameters. For example, the threshold can depend on the value for AC. As another example, the threshold can adjust depending on the number or prior unsuccessful transmission attempts.

It is understood that one or more instructions 232 and 234 can include determining any ratio between and/or otherwise comparing at least two of:the total number of (active) client devices associated to the AP or part of the BSS, the number of (active) high efficiency client devices, the total number of active client devices associated to the AP less the number of active high-efficiency client devices (i.e. the rest of the client devices). For clarity, this is reflected in FIG. 2C.

Hardware processor 222 can include instruction 236 for dynamically adjusting one or more parameters, such as MU EDCA parameters and/or EDCA parameters, if the he-client-density is less than and/or equal to the threshold (i.e. is not greater than and/or equal to the threshold). Instruction 236 can include adjusting the one or more parameters when the total number of active client devices associated to the AP less the number of active high-efficiency client devices, exceeds the number of active high-efficiency client devices. Instruction 236 can include adjusting the one or more parameters, when the number of active high-efficiency client devices is less than the total number of active client devices associated to the AP less the number of active high-efficiency client devices. Instruction 236 can include adjusting one or more parameters so access to one or more channels of the AP is increased by the high-efficiency client devices (e.g. those determined at execution of instruction 228). Instruction 236 can include adjusting one or more parameters so MU EDCA parameters are set to be more aggressive than EDCA parameters. Instruction 236 can include adjusting a value of the parameter based on the number of active high efficiency client devices, and/or the number of total active client devices. This instruction can include one or more prioritization logic as described herein. Other means of dynamically adjusting one or more parameter, e.g. for dynamic adjustment of channel access prioritization, have been described herein. It is understood that execution of instruction 236 can include these other means of dynamically adjusting one or more parameters discussed herein.

Hardware processor 222 can include instruction 238 for dynamically adjusting one or more parameters, such as MU EDCA parameters and/or EDCA parameters, if the he-client-density is greater than and/or equal to the threshold. Instruction 238 can include adjusting the one or more parameters, when the number of active high-efficiency client devices exceeds the total number of active client devices associated to the AP less the number of active high-efficiency STA. Instruction 238 can including adjusting the one or more parameters, when the total number of active client devices associated to the AP less the number of active high-efficiency STA, is less than the number of active high efficiency client devices. Instruction 238 can include dynamically adjusting or adapting a MU EDCA parameter set (e.g. adjusting one or more values thereof) to provide for decreased access to one or more channels of the AP by the high-efficiency client devices. Instruction 238 can include dynamically adjusting or adapting a MU EDCA parameter set (e.g. adjusting one or more values thereof) to provide for decreased access to one or more channels of the AP by the high-efficiency client devices, but not less than the access to the one or more channels afforded to the non-high-efficiency client devices.

Instruction 238 can include dynamically adapting the MU EDCA parameter set to equal the EDCA parameter set so as to reduce collisions between the high-efficiency client devices. Instruction 238 can include adjusting one or more parameters so that MU EDCA parameters are set to be as aggressive (or conservative) as EDCA parameters. Instruction 238 can include adjusting one or more parameters so MU EDCA parameters are set to be less aggressive (or more conservative) than EDCA parameters. Legacy EDCA parameters can be made more conservative so that if MU EDCA parameters are set to the original value of legacy EDCA parameters, the MU EDCA parameters can still remain more aggressive than the new legacy EDCA parameters. Instruction 238 can include adjusting a value of at least one parameter based on the number of active high efficiency client devices, and/or the number of total active client devices. This instruction can include one or more prioritization logic as described herein. This instruction can allow for dynamic adjustment of channel access prioritization, examples of which have been described herein. This instruction can dynamically adjust one or more parameters, such as MU EDCA parameters for channel access prioritization, examples of which have been described herein. It is understood that execution of instruction 238 can include means of dynamically adjusting one or more parameters discussed herein.

One or more of the instructions 226-238 can be repeated, so that one or more parameters as described herein are dynamically adjusted based on requirements (such as channel access priority requirements, but also collision avoidance requirements) for the BSS and/or individual client devices. One or more of the instructions 226-238 can be repeated so that one or more parameters are adjusted (e.g. at execution of instructions 236 and/or 238) based on a comparison of he-client-density to more than one thresholds (e.g. by adjusting the threshold each subsequent execution of instruction 234). One or more of the instructions 226-238 can be repeated so that one or more parameters are adjusted based on the variety of client devices (and numbers and/or proportions thereof) associated to the AP (or part of the BSS). It is understood that one or more of the instructions 234-238 can be performed simultaneously.

Figure 2C:
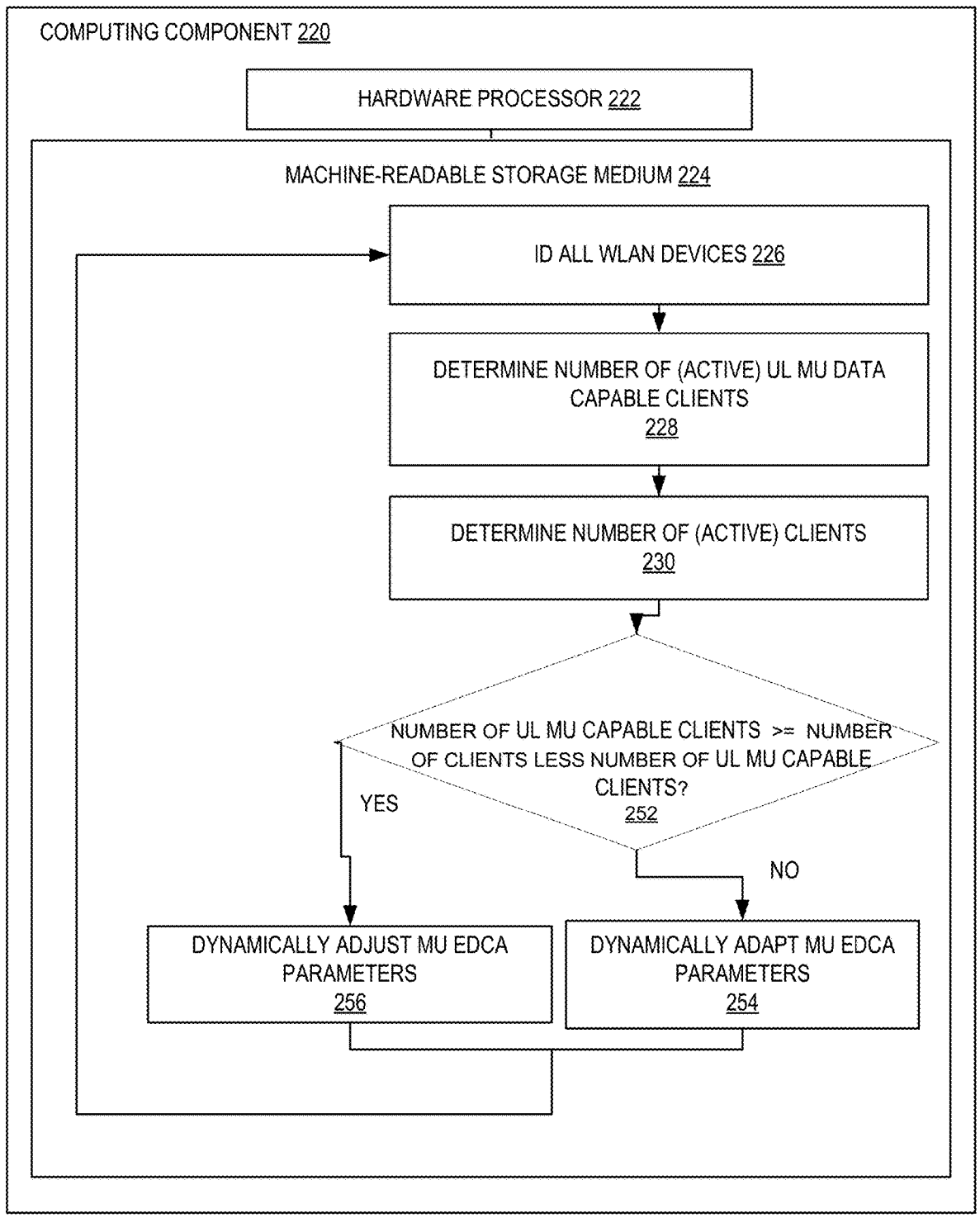
FIG. 2C illustrates another example computing component for effectuating dynamically prioritized channel access in the AP of FIG. 2A.

FIG. 2C depicts another block diagram of an embodiment of example computing component or device 220 for prioritizing channel access. In the example implementation of FIG. 2C, similar to the example implementation of FIG. 2B, computing component 220 includes a hardware processor, 222, and machine-readable storage medium, 224. In some embodiments, computing component 220 may be an embodiment of a controller, e.g., a controller such as controller 104 (FIG. 1A), or another component of wireless network 100, e.g., an AP such as AP 106a (FIG. 1A), for example.

Hardware processor 222 may fetch, decode, and execute instructions, such as instructions 226-256, to control processes or operations for prioritizing one or more channel access (such as WLAN device or application). As an alternative or in addition to retrieving and executing instructions, hardware processor 222 may include one or more electronic circuits that include electronic components for performing the functionality of one or more instructions, such as a field programmable gate array (FPGA), application specific integrated circuit (ASIC), or other electronic circuits. Instructions 226-256 can allow for dynamic and/or intelligent adjustment of channel access prioritization. Although instructions 226-256 are shown, it can be understood that the instructions can be performed in any order, without some of the instructions shown, and/or with the inclusion of other instructions not shown, and the instructions would still fall within the scope of the disclosure.

As described in detail below, machine-readable storage medium 224 may be encoded with executable instructions, for example, instructions 226-256.

Hardware processor 222 may execute instructions 226-230, which can be the same or similar instructions as instructions 226-230 shown in FIG. 2B. Hardware processor 22 may execute instruction 226 to identify WLAN devices in BSS, such as WLAN devices associated to AP and/or sensing the channel. Hardware processor 222 may execute instruction 228 to determine which of the WLAN devices are MU data capable and/or high efficiency client devices. This can include determining which WLAN devices are associated to the BSS and/or AP, that are MU data capable and/or high efficiency WLAN devices. This can include determining which of the WLAN devices are 802.11ax aware devices and/or not 802.11ax devices. This can include determining the HE-clients.

Hardware processor 222 may execute instruction 230 to determine which of the client devices (e.g. those identified at execution of instruction 226) are active client devices. Instruction 230 can include determining which of the WLAN devices are active WLAN devices. Instruction 230 can include examining one or more DL and/or UL queue to determine which devices have frames and/or traffic in the queue to be transmitted. Instruction 230 can include examining the number of WLAN devices and/or which WLAN devices have data buffered at the WLAN device for transmission. Instruction 230 can include determining which (and how many) WLAN devices are sensing the transmission channel. Executing instructions 228 and/or 230 can include sorting the client devices (i.e. the client devices that were identified at step 226), e.g. by a requested priority, and/or the amount of data buffered. Executing instructions 228 and/or 230 can include determining which WLAN devices are not MU capable devices or not high efficiency client devices.

As described herein, one or more parameters can be dynamically adjusted. For example, the one or more parameters can be adjusted based on the number of active MU capable client devices, the number of the he-clients, and/or the total number of active client devices in the BSS (for example, based on a comparison and/or a ratio thereof). In general, the parameters can be adjusted based on the numerosity and/or the mix of client devices in the BSS (or associated to the AP).

Thus, hardware processor 222 can include instruction 252 for making a comparison of the number of (active) HE-clients, to the number of (total) (active) clients less the number of (active) HE-clients. Instruction 252 can include a comparison of the number of HE-clients to a number of other client devices associated to the AP and/or in the BS. The number of devices compared can be one or more client devices as determined at execution of either or all of instructions 226-230.

The number of he-clients can be total number of (active) client devices associated to the AP (and/or in the BSS) which are MU capable client devices.

Hardware processor 222 can include instructions 254-256 for dynamically adjusting one or more parameters, such as MU EDCA parameters and/or EDCA parameters, depending on an outcome of execution of instruction 252.

Hardware processor 222 can execute instruction 254 when the total number of (active) client devices associated to the AP less the number of (active) high-efficiency client devices, exceeds (or is equal to) the number of (active) high-efficiency client devices. Instruction 254 can be the same or similar to instruction 236 described with reference to FIG. 2B. Hardware processor 222 can execute instruction 254 when the number of (active) high-efficiency client devices does not exceed the total number of (active) client devices associated to the AP less the number of (active) high-efficiency client devices.

Execution of instruction 254 can include adjusting the one or more parameters. Instruction 236 can include adjusting one or more parameters so access to one or more channels of the AP is increased by the high-efficiency client devices (e.g. those determined at execution of instruction 228). Instruction 254 can include adjusting one or more parameters so MU EDCA parameters are set to be more aggressive than EDCA parameters. Instruction 254 can include adjusting a value of at least one parameter in a parameter set based on the number of (active) high efficiency client devices, and/or the number of total (active) client devices. This instruction can include one or more prioritization logic as described herein. Other means of dynamically adjusting one or more parameter, e.g. for dynamic adjustment of channel access prioritization, have been described herein. It is understood that execution of instruction 254 can include these other means of dynamically adjusting one or more parameters discussed herein.

Hardware processor 222 can include instruction 256 for dynamically adjusting one or more parameters, such as MU EDCA parameters and/or EDCA parameters, when the number of (active) high-efficiency client devices exceeds (or is equal to) the total number of (active) client devices associated to the AP (or part of the BSS) less the number of (active) high-efficiency client devices. Instruction 256 can be the same or similar to instruction 238 as described with reference to FIG. 2B. Instruction 256 can including adjusting the one or more parameters, when the total number of (active) client devices associated to the AP (or part of the BSS) less the number of (active) high-efficiency client devices, is less than (or equal to) the number of active high efficiency client devices. Instruction 256 can include dynamically adjusting or adapting a MU EDCA parameter set (e.g. adjusting one or more values thereof) to provide for decreased access to one or more channels of the AP by the high-efficiency client devices. Instruction 256 can include dynamically adjusting or adapting a MU EDCA parameter set (e.g. adjusting one or more values thereof) to provide for decreased access to one or more channels of the AP by the high-efficiency client devices, but not less than access afforded to non-high efficiency client devices.

Instruction 256 can include dynamically adapting the MU EDCA parameter set to equal the EDCA parameter set so as to reduce collisions between the high-efficiency client devices. Instruction 256 can include adjusting one or more parameters so that MU EDCA parameters are set to be as aggressive (or conservative) as EDCA parameters. Instruction 256 can include adjusting one or more parameters so MU EDCA parameters are set to be less aggressive (or more conservative) than EDCA parameters. Legacy EDCA parameters can be made more conservative so that if MU EDCA parameters are set to the original value of legacy EDCA parameters, the MU EDCA parameters can still remain more aggressive than the new legacy EDCA parameters. Instruction 256 can include adjusting a value of at least one parameter based on the number of active high efficiency client devices, and/or the number of total active client devices. For example, instruction 256 can include adjusting a value of at least one parameter, if the number of active high efficiency client devices, and/or the number of total active client devices is below and/or above a threshold value. This instruction can include one or more prioritization logic as described herein. This instruction can allow for dynamic adjustment of channel access prioritization, examples of which have been described herein. This instruction can dynamically adjustment one or more parameters, such as MU EDCA parameters for channel access prioritization, examples of which have been described herein. It is understood that execution of instruction 256 can include these other means of dynamically adjusting one or more parameters discussed herein.

One or more of the instructions 226-256 can be repeated, so that one or more parameters as described herein are dynamically adjusted based on requirements (such as channel access priority requirements, but also collision avoidance requirements) for the BSS and/or individual client devices. One or more of the instructions 226-256 can be repeated so that one or more parameters are adjusted (e.g. at execution of instructions 254 and/or 256) based on the variety of client devices (and numbers or proportions thereof) associated to the AP (or part of the BSS). It is understood that one or more of the instructions 252-256 can be performed simultaneously. For example, if MU EDCA parameters are set more aggressive at execution of instruction 236, then the level of aggressiveness can be determined by knowing the absolute number of he-clients or MU UL data capable clients, (i.e. as part of execution of instruction 252) and the level of aggressiveness can be adapted to at execution of instruction 254 (i.e. by dynamic adjustment of MU EDCA parameters).

Hardware processor 222 shown in FIG. 2B and/or FIG. 2C can further include instructions for sorting, scheduling, and/or allocating resources for one or more of the client devices (not shown, but can be included in instructions 226-256, or before or after either of these instructions). For example, client devices can be sorted based on the priority for channel access, e.g. based on application type, AC, data size in buffer. Hardware processor 222 shown in FIG. 2B and/or FIG. 2C can further include one or more instructions for sending one or more trigger frames and/or scheduling instructions as described herein (not shown, but can be included in instructions 226-256, and/or before or after either of these instructions).

The client devices with higher priority can be scheduled for UL transmissions more often than the other client devices, at least by making one or more parameters more aggressive. Such client devices can also be provided more channel resources for their transmissions. This increase in channel resources can translate to larger resource units (RUs) in the case of scheduled UL OFDMA, or a greater number of spatial streams in the case of scheduled UL MU-MIMO. This increase in channel resources can translate to more aggressive EDCA parameters and/or MU EDCA parameters in the case of SU (such as CSMA/CA) (e.g. as adjusted when executing instructions 226-238). Hardware processor 222 shown in FIG. 2B and/or FIG. 2C can determine the AC (or other QoS parameter) of corresponding transmissions. The AP can then use trigger frame (or other scheduling information) to schedule the client device to transmit frames using MU (e.g. OFDMA, MU-MIMO, or a combination thereof), and/or SU (i.e. by CSMA/CA with EDCA and/or MU EDCA parameters). In some embodiments, the trigger frame may include values for one or more parameters, such as EDCA and/or MU EDCA parameters, including but not limited to AC, CWmin, CWmax, and/or MU EDCA timer. In some embodiments, a beacon (e.g. by the AP) may include values for one or more parameters, such as EDCA and/or MU EDCA parameters, including but not limited to AC, CWmin, CWmax, and/or MU EDCA timer. The beacon can be a management frame. In some embodiments, a probe response may include the values for one or more parameters, such as EDCA and/or MU EDCA parameters, including but not limited to AC, CWmin, CWmax, and/or MU EDCA timer.

For example, in some embodiments, EDCA parameter set can be sent with a beacon (e.g. before executing instruction 234), and a trigger frame including one or more updated parameters (e.g. parameters adjusted and/or updated at execution of instructions 236 and/or 238) can be sent at or after execution of either of instructions 234-348. The sequence of beacons and trigger frames is generally reflected in FIG. 2D.

It should be understood that trigger frames can be used to relay information (from an AP) regarding the time when a client device can begin transmitting its queued data/packets/frames to the AP, along with information regarding transmit rate, transmit power, RU size, and spatial streams/subchannels allocated to the receiving client device (discussed above). With the use of such trigger frame information, in conjunction with other fields and/or information, a client device can be made and/or instructed to transmit its queued frames according to the desired priority (discussed in greater detail below). It is understood that trigger frames can be adjusted so that priority is optimized for the STA, but also in view of the totality of client devices in the BSS. For example, the RU size can be optimized for UL transmission. It is understood that trigger frames can be tailored for one or more desired and/or determined transmission mode for each WLAN device. It is understood that trigger frames can be tailored for the DL and/or UL direction.

Sorted client devices having the highest priority can be the ones for which RU size is maximized. The Resource Unit (RU) assignment to other client devices can be prioritized against other client devices, both in terms of how often they are assigned the RUs)(selected for OFDMA transmissions) as well as the size of the RUs. In some embodiments, the RU size assigned to client devices with the smaller UL queue-depth will be proportional to airtime determined by the number of bytes queued in the STA. For client devices with larger UL queue-depth(s), the entire channel width can be allocated for the RU. It should be understood that UL queue-depth can be implementation-dependent, and thus, in some embodiments, an applicable queue-depth threshold can be specified against which STA queue-depth can be compared to determine if the queue-depth is "smaller" than the threshold or "larger" than the threshold.

Sorted client devices having the highest priority can be those for which one or more parameters are set more aggressive (e.g. SU related parameters). Higher priority client devices can be prioritized against other client devices, by adjusting one or more of the EDCA and/or MU EDCA parameters, including but not limited to AC, CWmin, CWmax, and/or MU EDCA timer, to be more aggressive.

Hardware processor 222 of FIG. 2B and/or FIG. 2C may execute instruction (not shown) to determine the UL transmission mode for each client device. In some embodiments, UL MU-MIMO can be used for data transmission within RUs for client devices with high priority for transmitting frames from those client devices to the AP. client devices with smaller UL queue-depth (measured in bytes) may be configured to use UL MU OFDMA. For clients with a limited number of antennas, again, partial bandwidth UL MU-MIMO can be used within the RU, effectively sharing it between the high-priority client devices, while ensuring the latency among the high-priority client devices is minimized. For client devices with larger UL queue-depth, which as noted above, can be allocated an entire channel-width for the RU, full bandwidth UL MU-MIMO can still be used across client devices. It should be noted that even in this case, such client devices are prioritized in terms of the number of times they are grouped for MU-MIMO transmissions and the number of spatial streams assigned to them.

In accordance with some embodiments, the prioritization of channel access and traffic can be performed in conjunction with an AP upgrade. Accordingly, hardware processor 222 shown in FIG. 2B and/or FIG. 2C may execute one or more instruction (not shown) to perform DL and/or UL scheduling. It should be understood that channel access prioritization described above can be performed or used independently, or in addition to/conjunction with any other form of prioritization used for UL and/or DL traffic, where some "net" prioritization can be achieved using multiple mechanisms (i.e., that described herein and another prioritization mechanism(s)).

Figure 2D:
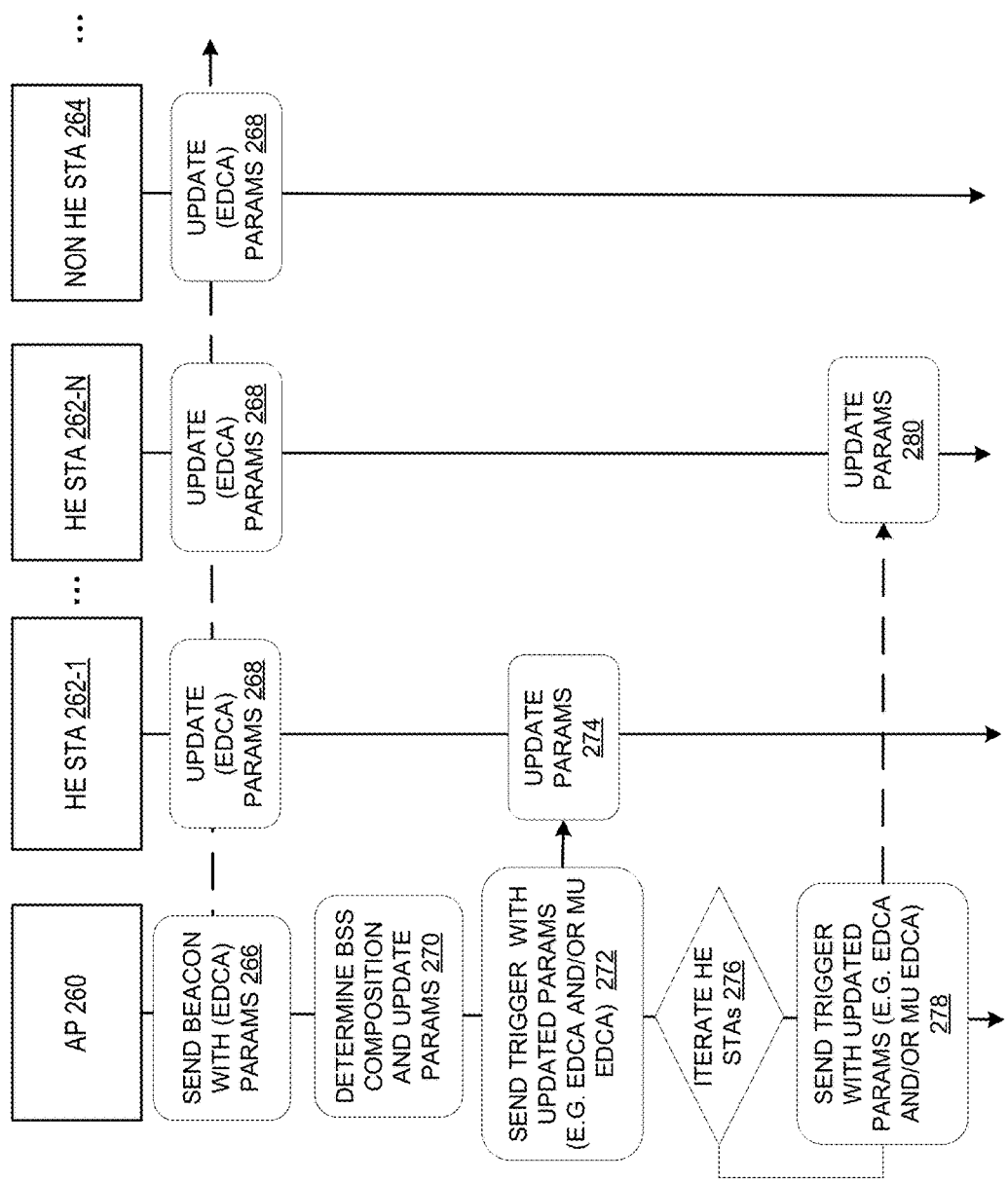
FIG. 2D shows an example method for effectuating dynamically prioritized channel access in a BSS in accordance with some embodiments.

FIG. 2D shows an example method and general timing diagram 259 for effectuating dynamically prioritized channel access in a BSS in accordance with some embodiments. As shown in FIG. 2D and as described herein, channel access can be dynamically prioritized by dynamic adjustment of values for one or more parameters for communication over the channel.

One or more portions of the method can be executed by WLAN devices (e.g. processors thereof). A BSS can include AP 260. AP 260 can be AP 201 as shown in FIG. 2A, and/or include hardware processor 222 as shown in FIG. 2B and/or FIG. 2C. The BSS can include one or more client devices. These client devices can include client devices 210-1 and/or 210-2 as shown with reference to FIG. 2A. The BSS can include one or more high efficiency or MU-data capable client devices, shown here as HE client devices 262-1 to 262-N. The BSS can further include one or more legacy, non-high efficiency client devices, or non-MU data capable devices, shown here as non he-client device 264.

The AP 260 can perform step 266 for sending a beacon with one or more parameters, such as legacy EDCA parameters. The one or more client devices can perform step 268 for updating a set of parameters (such as legacy EDCA parameters) based on the beacon.

The AP 260 can perform step 270 for determining the BSS composition and update values for one or more parameters. The values for the one or more parameters can be updated based on the BSS composition (among other reasons). The values for the one or more parameters can be updated so that channel access priority is dynamically configured. Performing step 270 can include determining the variety of client devices (and numbers and/or proportions thereof) associated to the AP (or part of the BSS). Performing step 270 can include determining number of active MU capable client devices or high efficiency clients, and/or the total number of active client devices in the BSS or associated to AP 260. Performing step 270 can include determining values for one or more parameters based on the variety of client devices (and numbers and/or proportions thereof) associated to the AP (or part of the BSS). The values for one or more parameters can be such, that channel access is prioritized for MU-capable or high efficiency client devices (such as 802.11ax client devices) over non-MU-capable or non HE-client devices, even if the MU-capable or high efficiency client devices choose to employ SU means of channel access. However, the values for one or more parameters can also be such that the risk for one or more frame collisions is considered (e.g. minimized).

Performing step 270 can include execution of one or more of instructions 226-256 as described with reference to FIG. 2B and/or FIG. 2C. It can be understood that steps 266 and/or 268 can be performed at or around the same time, or interchangeably with step 270.

AP 260 can perform step 272 for sending a trigger with one or more updated (e.g. adjusted or not adjusted) parameters. The updated parameters can be the parameters as updated at step 270. The trigger can be part of a trigger frame or other frame that can include one or more scheduling information for devices. For example, the trigger frame based be based on a determined transmission mode for each client device. The trigger can be sent to specific HE-devices. For example, trigger at step 272 can be sent to high efficiency client device 262-1. When received by high efficiency client device 262-1, the client device can perform step 274 for updating the parameters (i.e. values thereof). The HE-client device 262-1 can then transmit one or more frames based on the information from the trigger, and based on the updated parameters. For example, the HE client device can transmit one or more frames according to SU and/or MU schemes as described herein (steps not shown in FIG. 2D).

In some embodiments a trigger may be unique for each device, and/or values of parameters can be unique to each device. As such, in some embodiments, the AP 260 can perform step 276 and step 278 for iteratively sending one or more triggers with updated parameters to the one or more other client devices. For example, step 278 can include sending a trigger with updated parameters (such as legacy EDCA and/or MU EDCA parameters) to client device 262-N. For example, trigger sent to client device 262-N (e.g. at steps 276-278) can include updated values for MU EDCA parameters such as CWmin, CWmax, and MU EDCA timer. Client device 262-N can perform step 280 of updating values for the parameters based on the trigger. For example, the updated parameters can have values which were different compared to values of the parameters at execution of step 268. Client device 262-N can transmit one or more frames based on those updated parameters, e.g. by SU and/or MU means (step not shown in FIG. 2D).

It is understood that the various WLAN devices part of a BSS configuration and/or associated to the AP 260 can receive the one or more parameters as determined by methods and systems described herein, and can additionally transit frames based on values for those parameters.

Figure 3:
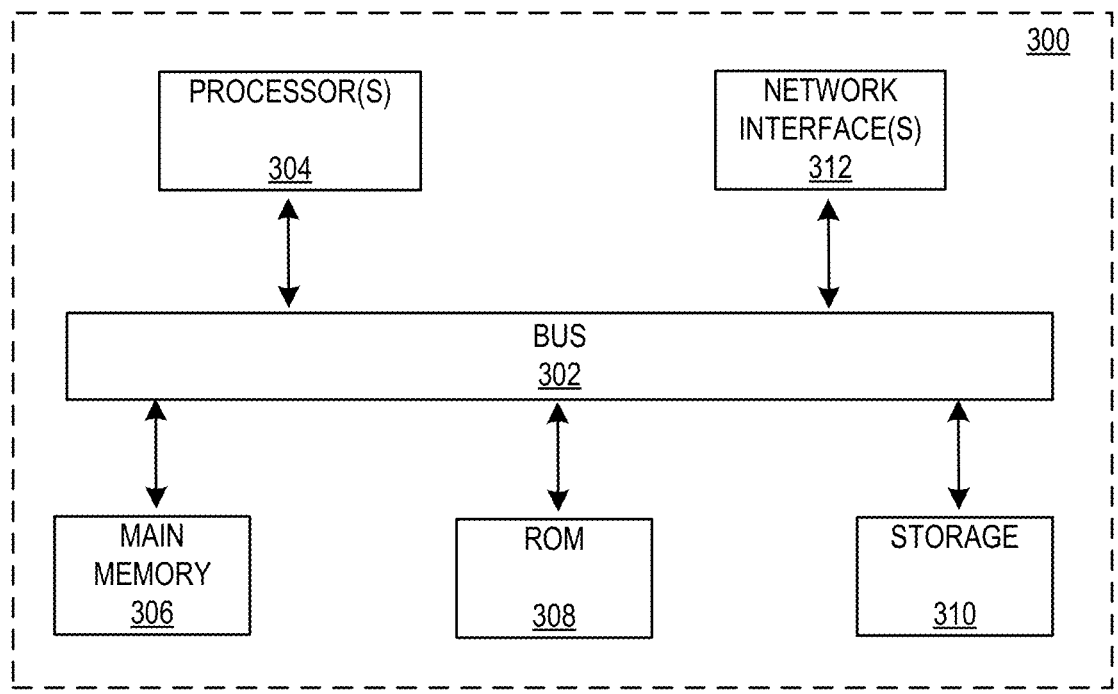
FIG. 3 illustrates an example computing component in which various embodiments described herein may be implemented.

FIG. 3 depicts a block diagram of an example computer system 300 in which various of the embodiments described herein may be implemented. The computer system 300 includes a bus 302 or other communication mechanism for communicating information, one or more hardware processors 304 coupled with bus 302 for processing information. Hardware processor(s) 304 may be, for example, one or more general purpose microprocessors.

The computer system 300 also includes a main memory 306, such as a random access memory (RAM), cache and/or other dynamic storage devices, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

The computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc., is provided and coupled to bus 302 for storing information and instructions.

Computer system 300 may further include at least one network interface 312, such as a network interface controller (NIC), network adapter, or the like, or a combination thereof, coupled to bus 302 for connecting computer system 300 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor(s) 304 executing one or more sequences of one or more instructions contained in main memory 306. Such instructions may be read into main memory 306 from another storage medium, such as storage device 310. Execution of the sequences of instructions contained in main memory 306 causes processor(s) 304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 310. Volatile media includes dynamic memory, such as main memory 306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 302. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for prioritizing access point (AP) channel access, comprising:
    determining a number of active uplink (UL) multi-user (MU) data capable stations (STAs) associated to the AP;
    determining a total number of active STAs associated to the AP;
    dynamically adapting a MU enhanced distributed channel access (EDCA) parameter set to provide for increased access to one or more channels of the AP by the UL MU data capable STAs when the total number of active STAs associated to the AP less the number of active UL MU data capable STAs exceeds the number of active UL MU data capable STAs; and
    dynamically adapting the MU EDCA parameter set to equal a legacy EDCA parameter set to reduce collisions between the UL MU data capable STAs when the number of active UL MU data capable STAs exceeds or equals the total number of active STAs associated to the AP less the number of active UL MU data capable STAs.

2. The method of claim 1, further comprising determining that the number of active UL MU data capable STAs exceeds the total number of active STAs associated to the AP less the number of active UL MU data capable STAs, by determining that a density of active UL MU data capable STAs compared to the total number of active STAs associated to the AP exceeds or is equal to a first density threshold value.

3. The method of claim 2, further comprising determining that the total number of active STAs associated to the AP less the number of active UL MU data capable STAs exceeds the number of active UL MU data capable STAs, by determining the density of active UL MU data capable STAs compared to the total number of active STAs associated to the AP, does not exceed the first density threshold value.

4. The method of claim 3, further comprising dynamically adapting the MU EDCA parameter set to provide for even more increased access to the one or more channels of the AP by the UL MU data capable STAs when the density of active UL MU data capable STAs compared to the total number of active STAs associated to the AP does not exceed a second density threshold value, wherein the second density threshold value is lower than the first density threshold value.

5. The method of claim 3, further comprising dynamically adapting the MU EDCA parameter set to provide for even more increased access to the one or more channels of the AP by the UL MU data capable STAs when the total number of active STAs associated to the AP is less than a Basic Service Set (BSS) STA population size threshold value.

6. The method of claim 5, wherein dynamically adapting the MU EDCA parameter set to provide for even more increased access to one or more channels of the AP comprises adjusting one or more of the MU EDCA parameters to be even more aggressive.

7. The method of claim 1, wherein dynamically adapting the MU EDCA parameter set comprises adjusting at least one of a minimum contention window (CWmin), a maximum contention window (CWmax), or a MU EDCA timer.

8. The method of claim 7, further comprising adjusting the CWmin parameter when the total number of active STAs associated to the AP less the number of active UL MU data capable STAs exceeds the number of active UL MU data capable STAs, and wherein a value to which CWmin is adjusted depends on the number of active UL MU data capable STAs.

9. The method of claim 7, further comprising adjusting the CWmin parameter when the total number of active STAs associated to the AP less the number of active UL MU data capable STAs exceeds the number of active UL MU data capable STAs, and wherein the value to which CWmin is adjusted is half or less than half of a value for a legacy CWmin parameter of the legacy EDCA parameter set.

10. The method of claim 7, further comprising adjusting the CWmin parameter when the total number of active STAs associated to the AP less the number of active UL MU data capable STAs exceeds the number of active UL MU data capable STAs, and wherein a value to which CWmin is adjusted is set to be more aggressive than a value of a legacy CWmin parameter of the legacy EDCA parameter set.

11. The method of claim 7, further comprising adjusting the MU EDCA timer, wherein the value for the MU EDCA timer is determined based on an amount of data buffered at the active-UL MU data capable STAs and the number of UL MU data capable STAs, such that each of the UL MU data capable STAs can be scheduled at least once before an expiration of the MU EDCA timer.

12. An access point (AP) configured to prioritize access to one or more channels of the AP, comprising:
    a hardware processor;
    a machine readable storage medium comprising one or more instructions, wherein when the instructions are executed by the hardware processor, the AP:
    determines a number of active uplink (UL) multi-user (MU) data capable stations (STAs) associated to the AP;
    determines a total number of active STAs associated to the AP;
    dynamically adapts a MU enhanced distributed channel access (EDCA) parameter set to provide for increased access to the one or more channels of the AP by the UL MU data capable STAs when the total number of active STAs associated to the AP less the number of active UL MU data capable STAs exceeds the number of active UL MU data capable STAs;
    dynamically adapts the MU EDCA parameter set to equal a legacy EDCA parameter set to reduce collisions between the UL MU data capable STAs when the number of active UL MU data capable STAs exceeds the total number of active STAs associated to the AP less the number of active UL MU data capable STAs.

13. The AP of claim 12, wherein the one or more instructions are configured such that when executed by the hardware processor, the AP further determines that the number of active UL MU data capable STAs exceeds the total number of active STAs associated to the AP less the number of active UL MU data capable STAs, by determining that a density of active UL MU data capable STAs compared to the total number of active STAs associated to the AP exceeds or is equal to a first density threshold value.

14. The AP of claim 12, wherein the one or more instructions are configured such that when executed by the hardware processor, the AP further determines that the number of active uplink (UL) MU data capable STAs exceeds the total number of active STAs associated to the AP less the number of active UL MU data capable STAs, by determining a density of active UL MU data capable STAs compared to the total number of active STAs associated to the AP, does not exceed a first density threshold value.

15. The AP of claim 14, wherein the one or more instructions are configured such that when executed by the hardware processor, the AP dynamically adapts the MU EDCA parameter set to provide for even more increased access to the one or more channels of the AP by the UL MU data capable STAs, when the density of active UL MU data capable STAs compared to the total number of active STAs associated to the AP does not exceed a second density threshold value, wherein the second density threshold value is lower than the first density threshold value.

16. The AP of claim 14, wherein the one or more instructions are configured such that when executed by the hardware processor, the AP dynamically adapts the MU EDCA parameter set to provide for even more increased access to the one or more channels of the AP by the UL MU data capable STAs when the total number of active UL MU data capable STAs associated to the AP is less than a UL MU data capable STA population size threshold value.

17. The AP of claim 12, wherein the one or more instructions are configured such that when executed by the hardware processor, the AP dynamically adapts the MU EDCA parameter set to provide for even more increased access to one or more channels of the AP by adjusting one or more of the MU EDCA parameters to be more aggressive.

18. The AP of claim 12, wherein the one or more instructions are configured such that when executed by the hardware processor, the AP dynamically adapts the MU EDCA parameter set by adjusting at least one of a minimum contention window (CWmin), a maximum contention window (CWmax), or a MU EDCA timer.

19. The AP of claim 18, wherein the one or more instructions are configured such that when executed by the hardware processor, the AP adjusts the CWmin parameter when the total number of active STAs associated to the AP less the number of active UL MU data capable STAs exceeds the number of active UL MU data capable STAs, and wherein a value to which CWmin is adjusted is half or less than half of a value for a legacy CWmin parameter of the legacy EDCA parameter set.

20. The method of claim 18, further comprising adjusting the MU EDCA timer, wherein the value for the MU EDCA timer is determined based on an amount of data buffered at the active UL MU data capable STAs and the number of UL MU data capable STAs, such that each of the UL MU data capable STAs can be scheduled once before an expiration of the MU EDCA timer.

* * * * *